(12) United States Patent
Gopal et al.

(10) Patent No.: US 11,985,721 B2
(45) Date of Patent: *May 14, 2024

(54) TECHNIQUES FOR USER EQUIPMENT ANTENNA PRIORITIZATION

(71) Applicant: QUALCOMM Incorporated, San Diego, CA (US)

(72) Inventors: Thawatt Gopal, San Diego, CA (US); Brian Clarke Banister, San Diego, CA (US); Sridhar Bandaru, Westminster, CO (US); Reza Shahidi, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,991

(22) Filed: Jan. 26, 2023

(65) Prior Publication Data

US 2024/0008116 A1 Jan. 4, 2024

Related U.S. Application Data

(63) Continuation of application No. 17/446,562, filed on Aug. 31, 2021, now Pat. No. 11,596,015.

(60) Provisional application No. 63/200,279, filed on Feb. 26, 2021, provisional application No. 62/706,664, filed on Sep. 2, 2020.

(51) Int. Cl.
*H04W 76/15* (2018.01)
*H04B 7/08* (2006.01)

(52) U.S. Cl.
CPC .......... *H04W 76/15* (2018.02); *H04B 7/0802* (2013.01); *H04B 7/0868* (2013.01)

(58) Field of Classification Search
CPC .... H04W 76/15; H04B 7/0802; H04B 7/0868
See application file for complete search history.

(56) References Cited

U.S. PATENT DOCUMENTS

| | | | |
|---|---|---|---|
| 10,541,768 B2 | 1/2020 | Su et al. | |
| 10,716,157 B2 | 7/2020 | Belghoul et al. | |
| 11,596,015 B2 | 2/2023 | Gopal | |

(Continued)

FOREIGN PATENT DOCUMENTS

| CN | 109361444 A | 2/2019 |
|---|---|---|
| WO | WO-2021206861 | 10/2021 |

OTHER PUBLICATIONS

International Search Report and Written Opinion—PCT/US2021/048694—ISA/EPO—dated Jan. 26, 2022.

*Primary Examiner* — Hashim S Bhatti
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish a first communication link using a first radio access technology (RAT). The UE may establish a second communication link using a second RAT. The UE may determine whether to prioritize antenna selection for the first communication link using the first RAT or the second communication link using the second RAT. The UE may prioritize antenna selection for the first communication link or the second communication link based at least in part on the determination. Numerous other aspects are provided.

30 Claims, 9 Drawing Sheets

(56) References Cited

U.S. PATENT DOCUMENTS

| | | |
|---|---|---|
| 2013/0310045 A1* | 11/2013 | Yan ............... H04B 7/0404 455/437 |
| 2015/0264743 A1* | 9/2015 | Yan ............... H04B 7/0814 455/553.1 |
| 2016/0127006 A1* | 5/2016 | Majjigi ........... H04B 7/0802 455/78 |
| 2016/0242182 A1* | 8/2016 | Chen ............... H04B 7/061 |
| 2017/0265205 A1 | 9/2017 | Homchaudhuri et al. |
| 2020/0275259 A1 | 8/2020 | Zhu |
| 2020/0280827 A1 | 9/2020 | Fechtel et al. |
| 2020/0313714 A1 | 10/2020 | Ono |
| 2021/0400748 A1* | 12/2021 | Subramanian ........ H04W 76/15 |

* cited by examiner

610 — RAT 1 Tx Ant-1

| 4 Antennas | | Ant 4 | Ant 3 | Ant 2 | Ant 1 |
|---|---|---|---|---|---|
| | | RAT 2 Ant-4 (1st. Option) | | | |
| RAT 1 Selection | Ant 1 | - | Rx12 | Rx13 | Rx01, Tx |
| | | RAT 2 Ant-3 (2nd. Option) | | | |
| RAT 1 Selection | Ant 1 | Rx12 | - | Rx13 | Rx01, Tx |
| | | RAT 2 Ant-2 (3rd. Option) | | | |
| RAT 1 Selection | Ant 1 | Rx13 | Rx12 | - | Rx01, Tx |

620 — RAT 1 Tx Ant-2

| 4 Antennas | | Ant 4 | Ant 3 | Ant 2 | Ant 1 |
|---|---|---|---|---|---|
| | | RAT 2 Ant-4 (1st. Option) | | | |
| RAT 1 Selection | Ant 1 | - | Rx01, Tx | Rx13 | Rx12 |
| | | RAT 2 Ant-3 (2nd. Option) | | | |
| RAT 1 Selection | Ant 1 | Rx13 | Rx01, Tx | - | Rx12 |
| | | RAT 2 Ant-2 (3rd. Option) | | | |
| RAT 1 Selection | Ant 1 | Rx12 | Rx01, Tx | Rx13 | - |

630 — RAT 1 Tx Ant-3

| 4 Antennas | | Ant 4 | Ant 3 | Ant 2 | Ant 1 |
|---|---|---|---|---|---|
| | | RAT 2 Ant-4 (1st. Option) | | | |
| RAT 1 Selection | Ant 2 | - | Rx12 | Rx01, Tx | Rx13 |
| | | RAT 2 Ant-3 (2nd. Option) | | | |
| RAT 1 Selection | Ant 2 | Rx13 | - | Rx01, Tx | Rx12 |
| | | RAT 2 Ant-1 (3rd. Option) | | | |
| RAT 1 Selection | Ant 2 | Rx13 | Rx12 | Rx01, Tx | - |

640 — RAT 1 Tx Ant-4

| 4 Antennas | | Ant 4 | Ant 3 | Ant 2 | Ant 1 |
|---|---|---|---|---|---|
| | | RAT 2 Ant-1 (1st. Option) | | | |
| RAT 1 Selection | Ant 4 | Rx01, Tx | Rx12 | Rx13 | - |
| | | RAT 2 Ant-2 (2nd. Option) | | | |
| RAT 1 Selection | Ant 4 | Rx01, Tx | Rx12 | - | Rx13 |
| | | RAT 2 Ant-3 (3rd. Option) | | | |
| RAT 1 Selection | Ant 4 | Rx01, Tx | - | Rx13 | Rx12 |

FIG. 6

TECHNIQUES FOR USER EQUIPMENT ANTENNA PRIORITIZATION

CROSS-REFERENCE TO RELATED APPLICATION

This is a continuation of U.S. patent application Ser. No. 17/446,562, filed on Aug. 31, 2021, which claims priority to U.S. Provisional Patent Application No. 62/706,664, filed on Sep. 2, 2020, and to U.S. Provisional Patent Application No. 63/200,279, filed on Feb. 26, 2021, which are assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for user equipment antenna prioritization.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a first communication link using a first radio access technology (RAT); establishing a second communication link using a second RAT; determining whether to prioritize antenna selection for the first communication link using the first RAT or the second communication link using the second RAT; and prioritizing antenna selection for the first communication link or the second communication link based at least in part on the determination.

In some aspects, the method includes operating in a standalone mode on the first communication link using the first RAT wherein establishing the second communication link comprises establishing the second communication link using the second RAT to establish a dual connectivity configuration; and wherein determining whether to prioritize antenna selection for the first communication link using the first RAT or the second communication link using the second RAT comprises determining to prioritize antenna selection for the first communication link using the first RAT as an initial configuration for the dual connectivity configuration; establishing the second communication link comprises establishing the second communication link using the second RAT to establish a dual connectivity configuration; and determining whether to prioritize antenna selection for the first communication link using the first RAT or the second communication link using the second RAT comprises determining to prioritize antenna selection for the first communication link using the first RAT as an initial configuration for the dual connectivity configuration. In some aspects, the dual connectivity configuration comprises an Evolved Universal Mobile Telecommunications System Terrestrial Radio Access Network (E-UTRAN) NR dual connectivity (ENDC) configuration, or the dual connectivity configuration comprises a New Radio dual connectivity (NRDC) configuration.

In some aspects, determining whether to prioritize antenna selection for the first communication link using the first RAT or the second communication link using the second RAT comprises determining whether to prioritize antenna selection for the first communication link using the first RAT or the second communication link using the second RAT based at least in part on one or more antenna prioritization parameters. In some aspects, determining whether to prioritize antenna selection for the first communication link using the first RAT or the second communication link using the second RAT comprises determining to prioritize antenna selection for the first communication link using the first RAT based at least in part on a determination that at least a subset of the one or more antenna prioritization parameters are satisfied.

In some aspects, determining whether to prioritize antenna selection for the first communication link using the first RAT or the second communication link using the second RAT comprises determining to prioritize antenna selection for the second communication link using the second RAT based at least in part on a determination that at least a subset of the one or more antenna prioritization parameters are not satisfied.

In some aspects, the one or more antenna prioritization parameters include at least one of: a service type associated with the first communication link, a signal measurement associated with the first communication link, or a difference in signal measurements between a transmit antenna for the first communication link and a non-transmit antenna for the first communication link. In some aspects, determining whether to prioritize antenna selection for the first communication link using the first RAT or the second communication link using the second RAT comprises determining to prioritize antenna selection for the first communication link using the first RAT based at least in part on the service type associated with the first communication link being a voice over Long Term Evolution (VoLTE) service or a voice over New Radio (VoNR) service.

In some aspects, determining whether to prioritize antenna selection for the first communication link using the first RAT or the second communication link using the second RAT comprises determining to prioritize antenna selection for the first communication link using the first RAT based at least in part on a determination that the signal measurement associated with the first communication link does not satisfy a threshold. In some aspects, determining whether to prioritize antenna selection for the first communication link using the first RAT or the second communication link using the second RAT comprises determining to prioritize antenna selection for the second communication link using the second RAT based at least in part on a determination that the signal measurement associated with the first communication link satisfies a threshold.

In some aspects, determining whether to prioritize antenna selection for the first communication link using the first RAT or the second communication link using the second RAT comprises determining to prioritize antenna selection for the first communication link using the first RAT based at least in part on a determination that the difference in signal measurements between the transmit antenna for the first communication link and the non-transmit antenna for the first communication link satisfies a threshold. In some aspects, determining whether to prioritize antenna selection for the first communication link using the first RAT or the second communication link using the second RAT comprises determining to prioritize antenna selection for the second communication link using the second RAT based at least in part on a determination that the difference in signal measurements between the transmit antenna for the first communication link and the non-transmit antenna for the first communication link does not satisfy a threshold.

In some aspects, determining whether to prioritize antenna selection for the first communication link using the first RAT or the second communication link using the second RAT comprises determining to prioritize antenna selection for the first communication link using the first RAT; and wherein the method further comprises: selecting a first transmit antenna, of a plurality of antennas of the UE, for the first communication link; and selecting a second transmit antenna, of the plurality of antennas, for the second communication link, after selecting the first transmit antenna for the first communication link. In some aspects, selecting the first transmit antenna for the first communication link comprises selecting, as the first transmit antenna, a preferred transmit antenna for the first communication link.

In some aspects, selecting the second transmit antenna for the second communication link after selecting the first transmit antenna for the first communication comprises selecting, as the second transmit antenna, a remaining antenna of the plurality of antennas for the first communication link, wherein the remaining antenna is different from the preferred transmit antenna. In some aspects, the method includes determining a sounding reference signal (SRS) alternative path for the second transmit antenna; and determining a blanking mask for the first communication link on the first transmit antenna based at least in part on the SRS alternative path for the second transmit antenna. In some aspects, the method includes refraining from switching antenna selection priority between the first communication link and the second communication link for a configured time period from determining to prioritize antenna selection for the first communication link.

In some aspects, determining whether to prioritize antenna selection for the first communication link using the first RAT or the second communication link using the second RAT comprises determining to prioritize antenna selection for the second communication link using the second RAT; and wherein the method further comprises: selecting a first transmit antenna of the plurality of antennas of the UE for the second RAT; and selecting a second transmit antenna of the plurality of antennas for the first RAT after selecting the second transmit antenna for the second RAT. In some aspects, selecting the first transmit antenna for the second communication link comprises selecting, as the first transmit antenna, a preferred transmit antenna for the second communication link.

In some aspects, selecting the second transmit antenna for the first communication link after selecting the first transmit antenna for the second communication link comprises selecting, as the second transmit antenna, a remaining antenna of the plurality of antennas for the second communication link, wherein the remaining antenna is different from the preferred transmit antenna. In some aspects, the method includes determining an SRS alternative path for the second transmit antenna; and determining a blanking mask for the first communication link on the first transmit antenna based at least in part on the SRS alternative path for the second transmit antenna. In some aspects, the method includes refraining from switching antenna selection priority between the first communication link and the second communication link for a configured time period from determining to prioritize antenna selection for the second communication link. In some aspects, the first RAT comprises a Long Term Evolution (LTE) RAT, wherein the second RAT comprises a New Radio (NR) RAT. In some aspects, the first RAT and the second RAT share a radio frequency (RF) front-end of the UE.

In some aspects, determining whether to prioritize antenna selection for the first communication link using the first RAT or the second communication link using the second RAT comprises determining to prioritize antenna selection for the first communication link using the first RAT based at least in part on a determination that a second highest reference signal received power (RSRP) measurement associated with the first communication link does not satisfy a threshold. In some aspects, determining whether to prioritize antenna selection for the first communication link using the first RAT or the second communication link using the second RAT comprises determining to prioritize antenna selection for the second communication link using the second RAT based at least in part on a determination that a second highest RSRP measurement associated with the first communication link satisfies a threshold.

In some aspects, a UE for wireless communication includes a memory; and one or more processors coupled to the memory, the memory and the one or more processors configured to: establish a first communication link using a first RAT; establish a second communication link using a second RAT; determine whether to prioritize antenna selection for the first communication link using the first RAT or the second communication link using the second RAT; and prioritize antenna selection for the first communication link or the second communication link based at least in part on the determination.

In some aspects, the one or more processors are further configured to operate in a standalone mode on the first communication link using the first RAT; wherein the one or more processors, when establishing the second communication link, are configured to establish the second communication link using the second RAT to establish a dual connectivity configuration; and wherein the one or more processors, when determining whether to prioritize antenna selection for the first communication link using the first RAT or the second communication link using the second RAT, are configured to determine to prioritize antenna selection for the first communication link using the first RAT as an initial configuration for the dual connectivity configuration.

In some aspects, the dual connectivity configuration comprises an ENDC configuration or an NRDC configuration. In some aspects, the one or more processors, when determining whether to prioritize antenna selection for the first communication link using the first RAT or the second communication link using the second RAT, are configured to determine whether to prioritize antenna selection for the first communication link using the first RAT or the second communication link using the second RAT based at least in part on one or more antenna prioritization parameters. In some aspects, the one or more processors, when determining whether to prioritize antenna selection for the first communication link using the first RAT or the second communication link using the second RAT, are configured to determine to prioritize antenna selection for the first communication link using the first RAT based at least in part on a determination that at least a subset of the one or more antenna prioritization parameters are satisfied.

In some aspects, the one or more processors, when determining whether to prioritize antenna selection for the first communication link using the first RAT or the second communication link using the second RAT, are configured to determine to prioritize antenna selection for the second communication link using the second RAT based at least in part on a determination that at least a subset of the one or more antenna prioritization parameters are not satisfied. In some aspects, the one or more antenna prioritization parameters include at least one of: a service type associated with the first communication link, a signal measurement associated with the first communication link, or a difference in signal measurements between a transmit antenna for the first communication link and a non-transmit antenna for the first communication link.

In some aspects, the one or more processors, when determining whether to prioritize antenna selection for the first communication link using the first RAT or the second communication link using the second RAT, are configured to determine to prioritize antenna selection for the first communication link using the first RAT based at least in part on the service type associated with the first communication link being a VoLTE service or a VoNR service. In some aspects, the one or more processors, when determining whether to prioritize antenna selection for the first communication link using the first RAT or the second communication link using the second RAT, are configured to determine to prioritize antenna selection for the first communication link using the first RAT based at least in part on a determination that the signal measurement associated with the first communication link does not satisfy a threshold.

In some aspects, the one or more processors, when determining whether to prioritize antenna selection for the first communication link using the first RAT or the second communication link using the second RAT, are configured to determine to prioritize antenna selection for the second communication link using the second RAT based at least in part on a determination that the signal measurement associated with the first communication link satisfies a threshold. In some aspects, the one or more processors, when determining whether to prioritize antenna selection for the first communication link using the first RAT or the second communication link using the second RAT, are configured to determine to prioritize antenna selection for the first communication link using the first RAT based at least in part on a determination that the difference in signal measurements between the transmit antenna for the first communication link and the non-transmit antenna for the first communication link satisfies a threshold.

In some aspects, the one or more processors, when determining whether to prioritize antenna selection for the first communication link using the first RAT or the second communication link using the second RAT, are configured to determine to prioritize antenna selection for the second communication link using the second RAT based at least in part on a determination that the difference in signal measurements between the transmit antenna for the first communication link and the non-transmit antenna for the first communication link does not satisfy a threshold. In some aspects, the one or more processors, when determining whether to prioritize antenna selection for the first communication link or the second communication link using the second RAT, are configured to determine to prioritize antenna selection for the first communication link using the first RAT; and wherein the one or more processors are further configured to: select a first transmit antenna, of a plurality of antennas of the UE, for the first communication link; and select a second transmit antenna, of the plurality of antennas, for the second communication link, after selecting the first transmit antenna for the first communication link.

In some aspects, the one or more processors, when selecting the first transmit antenna for the first communication link, are configured to select, as the first transmit antenna, a preferred transmit antenna for the first communication link. In some aspects, the one or more processors, when selecting the second transmit antenna for the second communication link after selecting the first transmit antenna for the first communication, are configured to select, as the second transmit antenna, a remaining antenna of the plurality of antennas for the first communication link, wherein the remaining antenna is different from the preferred transmit antenna.

In some aspects, the one or more processors are further configured to determine a SRS alternative path for the second transmit antenna; and determine a blanking mask for the first communication link on the first transmit antenna based at least in part on the SRS alternative path for the second transmit antenna. In some aspects, the one or more processors are further configured to refrain from switching antenna selection priority between the first communication link and the second communication link for a configured time period from determining to prioritize antenna selection for the first communication link.

In some aspects, the one or more processors, when determining whether to prioritize antenna selection for the first communication link using the first RAT or the second communication link using the second RAT, are configured to determine to prioritize antenna selection for the second communication link using the second RAT; and wherein the one or more processors are further configured to select a first transmit antenna of a plurality of antennas of the UE for the second RAT; and select a second transmit antenna of the plurality of antennas for the first RAT after selecting the second transmit antenna for the second RAT. In some aspects, the one or more processors, when selecting the first transmit antenna for the second communication link, are configured to select, as the first transmit antenna, a preferred transmit antenna for the second communication link.

In some aspects, the one or more processors, when selecting the second transmit antenna for the first communication link after selecting the first transmit antenna for the second communication link, are configured to select, as the second transmit antenna, a remaining antenna of the plurality of antennas for the second communication link, wherein the remaining antenna is different from the preferred transmit antenna. In some aspects, the one or more processors are further configured to: determine an SRS alternative path for the second transmit antenna; and determine a blanking mask for the first communication link on the first transmit antenna based at least in part on the SRS alternative path for the second transmit antenna.

In some aspects, the one or more processors are further configured to refrain from switching antenna selection priority between the first communication link and the second communication link for a configured time period from determining to prioritize antenna selection for the second communication link. In some aspects, the first RAT comprises an LTE RAT; wherein the second RAT comprises an NR RAT. In some aspects, the first RAT and the second RAT share an RF front-end of the UE.

In some aspects, the one or more processors, to determine whether to prioritize antenna selection for the first communication link using the first RAT or the second communication link using the second RAT, are configured to determine to prioritize antenna selection for the first communication link using the first RAT based at least in part on a determination that a second highest RSRP measurement associated with the first communication link does not satisfy a threshold. In some aspects, determining whether to prioritize antenna selection for the first communication link using the first RAT or the second communication link using the second RAT includes determining to prioritize antenna selection for the second communication link using the second RAT based at least in part on a determination that a second highest RSRP measurement associated with the first communication link satisfies a threshold.

In some aspects, a non-transitory computer-readable medium storing a set of instructions for wireless communication includes one or more instructions that, when executed by one or more processors of a UE, cause the UE to: establish a first communication link using a first RAT; establish a second communication link using a second RAT; determine whether to prioritize antenna selection for the first communication link using the first RAT or the second communication link using the second RAT; and prioritize antenna selection for the first communication link or the second communication link based at least in part on the determination.

In some aspects, the one or more instructions further cause the UE to operate in a standalone mode on the first communication link using the first RAT; wherein the one or more instructions, that cause the UE to establish the second communication link, cause the UE to establish the second communication link using the second RAT to establish a dual connectivity configuration; and wherein the one or more instructions, that cause the UE to determine whether to prioritize antenna selection for the first communication link using the first RAT or the second communication link using the second RAT, cause the UE to determine to prioritize antenna selection for the first communication link using the first RAT as an initial configuration for the dual connectivity configuration.

In some aspects, the dual connectivity configuration comprises an ENDC configuration or an NRDC configuration. In some aspects, the one or more instructions, that cause the UE to determine whether to prioritize antenna selection for the first communication link using the first RAT or the second communication link using the second RAT, cause the UE to determine whether to prioritize antenna selection for the first communication link using the first RAT or the second communication link using the second RAT based at least in part on one or more antenna prioritization parameters.

In some aspects, the one or more instructions, that cause the UE to determine whether to prioritize antenna selection for the first communication link using the first RAT or the second communication link using the second RAT, cause the UE to determine to prioritize antenna selection for the first communication link using the first RAT based at least in part on a determination that at least a subset of the one or more antenna prioritization parameters are satisfied. In some aspects, the one or more instructions, that cause the UE to determine whether to prioritize antenna selection for the first communication link using the first RAT or the second communication link using the second RAT, cause the UE to determine to prioritize antenna selection for the second communication link using the second RAT based at least in part on a determination that at least a subset of the one or more antenna prioritization parameters are not satisfied.

In some aspects, the one or more antenna prioritization parameters include at least one of: a service type associated with the first communication link, a signal measurement associated with the first communication link, or a difference in signal measurements between a transmit antenna for the first communication link and a non-transmit antenna for the first communication link. In some aspects, the one or more instructions, that cause the UE to determine whether to prioritize antenna selection for the first communication link using the first RAT or the second communication link using the second RAT, cause the UE to determine to prioritize antenna selection for the first communication link using the first RAT based at least in part on the service type associated with the first communication link being a VoLTE service or a VoNR service.

In some aspects, the one or more instructions, that cause the UE to determine whether to prioritize antenna selection for the first communication link using the first RAT or the second communication link using the second RAT, cause the UE to determine to prioritize antenna selection for the first communication link using the first RAT based at least in part on a determination that the signal measurement associated with the first communication link does not satisfy a threshold. In some aspects, the one or more instructions, that cause the UE to determine whether to prioritize antenna selection for the first communication link using the first RAT or the second communication link using the second RAT, cause the UE to determine to prioritize antenna selection for the second communication link using the second RAT based at least in part on a determination that the signal measurement associated with the first communication link satisfies a threshold.

In some aspects, the one or more instructions, that cause the UE to determine whether to prioritize antenna selection for the first communication link using the first RAT or the second communication link using the second RAT, cause the UE to determine to prioritize antenna selection for the first communication link using the first RAT based at least in part on a determination that the difference in signal measurements between the transmit antenna for the first communication link and the non-transmit antenna for the first communication link satisfies a threshold. In some aspects, the one or more instructions, that cause the UE to determine whether to prioritize antenna selection for the first communication link using the first RAT or the second communication link using the second RAT, cause the UE to determine to prioritize antenna selection for the second communication link using the second RAT based at least in part on a determination that the difference in signal measurements between the transmit antenna for the first communication link and the non-transmit antenna for the first communication link does not satisfy a threshold.

In some aspects, the one or more instructions, that cause the UE to determine whether to prioritize antenna selection for the first communication link using the first RAT or the second communication link using the second RAT, cause the UE to determine to prioritize antenna selection for the first communication link using the first RAT; and wherein the one or more instructions, when executed by the one or more processors, further cause the UE to select a first transmit antenna, of a plurality of antennas of the UE, for the first communication link; and select a second transmit antenna, of the plurality of antennas, for the second communication link, after selecting the first transmit antenna for the first communication link. In some aspects, the one or more instructions, that cause the UE to select the first transmit antenna for the first communication link, cause the UE to select, as the first transmit antenna, a preferred transmit antenna for the first communication link.

In some aspects, the one or more instructions, that cause the UE to select the second transmit antenna for the second communication link after selecting the first transmit antenna for the first communication, cause the UE to select, as the second transmit antenna, a remaining antenna of the plurality of antennas for the first communication link, wherein the remaining antenna is different from the preferred transmit antenna. In some aspects, the one or more instructions further cause the UE to determine an SRS alternative path for the second transmit antenna; and determine a blanking mask for the first communication link on the first transmit antenna based at least in part on the SRS alternative path for the second transmit antenna.

In some aspects, the one or more instructions further cause the UE to refrain from switching antenna selection priority between the first communication link and the second communication link for a configured time period from determining to prioritize antenna selection for the first communication link. In some aspects, the one or more instructions, that cause the UE to determine whether to prioritize antenna selection for the first communication link using the first RAT or the second communication link using the second RAT, cause the UE to determine to prioritize antenna selection for the second communication link using the second RAT; and wherein the one more processors, when executed by the one or more processors, further cause the UE to select a first transmit antenna of a plurality of antennas for the UE for the second RAT; and select a second antenna of the plurality of antennas transmit antenna for the first RAT after selecting the second transmit antenna for the second RAT.

In some aspects, the one or more instructions, that cause the UE to select the first transmit antenna for the second communication link, cause the UE to select, as the first transmit antenna, a preferred transmit antenna for the second communication link. In some aspects, the one or more instructions, that cause the UE to select the second transmit antenna for the first communication link after selecting the first transmit antenna for the second communication link, cause the UE to select, as the second transmit antenna, a remaining antenna of the plurality of antennas for the second communication link, wherein the remaining antenna is different from the preferred transmit antenna.

In some aspects, the one or more instructions further cause the UE to: determine an SRS alternative path for the second transmit antenna; and determine a blanking mask for the first communication link on the first transmit antenna based at least in part on the SRS alternative path for the second transmit antenna. In some aspects, the one or more instructions further cause the UE to refrain from switching antenna selection priority between the first communication link and the second communication link for a configured time period from determining to prioritize antenna selection for the second communication link. In some aspects, the first RAT comprises an LTE RAT; wherein the second RAT comprises an NR RAT. In some aspects, the first RAT and the second RAT share an RF front-end of the UE.

In some aspects, the one or more instructions, that cause the one or more processors to determine whether to prioritize antenna selection for the first communication link using the first RAT or the second communication link using the second RAT, cause the one or more processors to determine to prioritize antenna selection for the first communication link using the first RAT based at least in part on a determination that a second highest RSRP measurement associated with the first communication link does not satisfy a threshold. In some aspects, the one or more instructions, that cause the one or more processors to determine whether to prioritize antenna selection for the first communication link using the first RAT or the second communication link using the second RAT, cause the one or more processors to determine to prioritize antenna selection for the second communication link using the second RAT based at least in part on a determination that a second highest RSRP measurement associated with the first communication link satisfies a threshold.

In some aspects, an apparatus for wireless communication includes means for establishing a first communication link using a first RAT; means for establishing a second communication link using a second RAT; means for determining whether to prioritize antenna selection for the first communication link using the first RAT or the second communication link using the second RAT; and means for prioritizing antenna selection for the first communication link or the second communication link based at least in part on the determination.

In some aspects, the apparatus includes means for operating in a standalone mode on the first communication link using the first RAT; wherein the means for establishing the second communication link comprises means for establishing the second communication link using the second RAT to establish a dual connectivity configuration; and wherein the means for determining whether to prioritize antenna selection for the first communication link using the first RAT or the second communication link using the second RAT comprises means for determining to prioritize antenna selection for the first communication link using the first RAT as an initial configuration for the dual connectivity configuration. The means for establishing the second communication link comprises means for establishing the second communication link using the second RAT to establish a dual connectivity configuration; and the means for determining whether to prioritize antenna selection for the first communication link using the first RAT or the second communication link using the second RAT comprises means for determining to prioritize antenna selection for the first communication link using the first RAT as an initial configuration for the dual connectivity configuration.

In some aspects, the dual connectivity configuration comprises an ENDC configuration or an NRDC configuration. In some aspects, the means for determining whether to prioritize antenna selection for the first communication link using the first RAT or the second communication link using the second RAT comprises means for determining whether to prioritize antenna selection for the first communication link using the first RAT or the second communication link using the second RAT based at least in part on one or more antenna prioritization parameters. In some aspects, the means for determining whether to prioritize antenna selection for the first communication link using the first RAT or the second communication link using the second RAT comprises means for determining to prioritize antenna selection for the first communication link using the first RAT based at least in part on a determination that at least a subset of the one or more antenna prioritization parameters are satisfied.

In some aspects, the means for determining whether to prioritize antenna selection for the first communication link using the first RAT or the second communication link using the second RAT comprises means for determining to prioritize antenna selection for the second communication link using the second RAT based at least in part on a determination that at least a subset of the one or more antenna prioritization parameters are not satisfied. In some aspects, the one or more antenna prioritization parameters include at least one of: a service type associated with the first communication link, a signal measurement associated with the first communication link, or a difference in signal measurements between a transmit antenna for the first communication link and a non-transmit antenna for the first communication link.

In some aspects, the means for determining whether to prioritize antenna selection for the first communication link using the first RAT or the second communication link using the second RAT comprises means for determining to prioritize antenna selection for the first communication link using the first RAT based at least in part on the service type associated with the first communication link being a VoLTE service or a VoNR service. In some aspects, the means for determining whether to prioritize antenna selection for the first communication link using the first RAT or the second communication link using the second RAT comprises means for determining to prioritize antenna selection for the first communication link using the first RAT based at least in part on a determination that the signal measurement associated with the first communication link does not satisfy a threshold.

In some aspects, the means for determining whether to prioritize antenna selection for the first communication link using the first RAT or the second communication link using the second RAT comprises means for determining to prioritize antenna selection for the second communication link using the second RAT based at least in part on a determination that the signal measurement associated with the first communication link satisfies a threshold. In some aspects, the means for determining whether to prioritize antenna selection for the first communication link using the first RAT or the second communication link using the second RAT comprises means for determining to prioritize antenna selection for the first communication link using the first RAT based at least in part on a determination that the difference in signal measurements between the transmit antenna for the first communication link and the non-transmit antenna for the first communication link satisfies a threshold.

In some aspects, the means for determining whether to prioritize antenna selection for the first communication link using the first RAT or the second communication link using the second RAT comprises means for determining to prioritize antenna selection for the second communication link using the second RAT based at least in part on a determination that the difference in signal measurements between the transmit antenna for the first communication link and the non-transmit antenna for the first communication link does not satisfy a threshold. In some aspects, the means for determining whether to prioritize antenna selection for the first communication link using the first RAT or the second communication link using the second RAT comprises means for determining to prioritize antenna selection for the first communication link using the first RAT; and wherein the apparatus further comprises: means for selecting a first transmit antenna, of a plurality of antennas of the UE, for the first communication link; and means for selecting a second transmit antenna, of the plurality of antennas, for the second communication link, after selecting the first transmit antenna for the first communication link.

In some aspects, the means for selecting the first transmit antenna for the first communication link comprises means for selecting, as the first transmit antenna, a preferred transmit antenna for the first communication link. In some aspects, the means for selecting the second transmit antenna for the second communication link after selecting the first transmit antenna for the first communication comprises means for selecting, as the second transmit antenna, a remaining antenna of the plurality of antennas for the first communication link, wherein the remaining antenna is different from the preferred transmit antenna.

In some aspects, the apparatus includes means for determining an SRS alternative path for the second transmit antenna; and means for determining a blanking mask for the first communication link on the first transmit antenna based at least in part on the SRS alternative path for the second transmit antenna. In some aspects, the apparatus includes means for refraining from switching antenna selection priority between the first communication link and the second communication link for a configured time period from determining to prioritize antenna selection for the first communication link.

In some aspects, the means for determining whether to prioritize antenna selection for the first communication link using the first RAT or the second communication link using the second RAT comprises means for determining to prioritize antenna selection for the second communication link using the second RAT; and wherein the apparatus further comprises means for selecting a first transmit antenna of a plurality of antennas of the apparatus for the second RAT; and means for selecting a second transmit antenna of the plurality of antennas for the first RAT after selecting the second transmit antenna for the second RAT. In some aspects, the means for selecting the first transmit antenna for the second communication link comprises means for selecting, as the first transmit antenna, a preferred transmit antenna for the second communication link.

In some aspects, the means for selecting the second transmit antenna for the first communication link after selecting the first transmit antenna for the second communication link comprises means for selecting, as the second transmit antenna, a remaining antenna of the plurality of antennas for the second communication link, wherein the remaining antenna is different from the preferred transmit antenna. In some aspects, the apparatus includes means for determining an SRS alternative path for the second transmit antenna; and means for determining a blanking mask for the first communication link on the first transmit antenna based at least in part on the SRS alternative path for the second transmit antenna.

In some aspects, the apparatus includes means for refraining from switching antenna selection priority between the first communication link and the second communication link for a configured time period from determining to prioritize antenna selection for the second communication link. In some aspects, the first RAT comprises an LTE RAT; wherein the second RAT comprises an NR RAT. In some aspects, the first RAT and the second RAT share an RF front-end of the UE.

In some aspects, the means for determining whether to prioritize antenna selection for the first communication link using the first RAT or the second communication link using the second RAT comprises means for determining to prioritize antenna selection for the first communication link using the first RAT based at least in part on a determination that a second highest RSRP measurement associated with the first communication link does not satisfy a threshold. In some aspects, the means for determining whether to prioritize antenna selection for the first communication link using the first RAT or the second communication link using the second RAT comprises means for determining to prioritize antenna selection for the second communication link using the second RAT based at least in part on a determination that a second highest RSRP measurement associated with the first communication link satisfies a threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of transmit/receive blanking, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
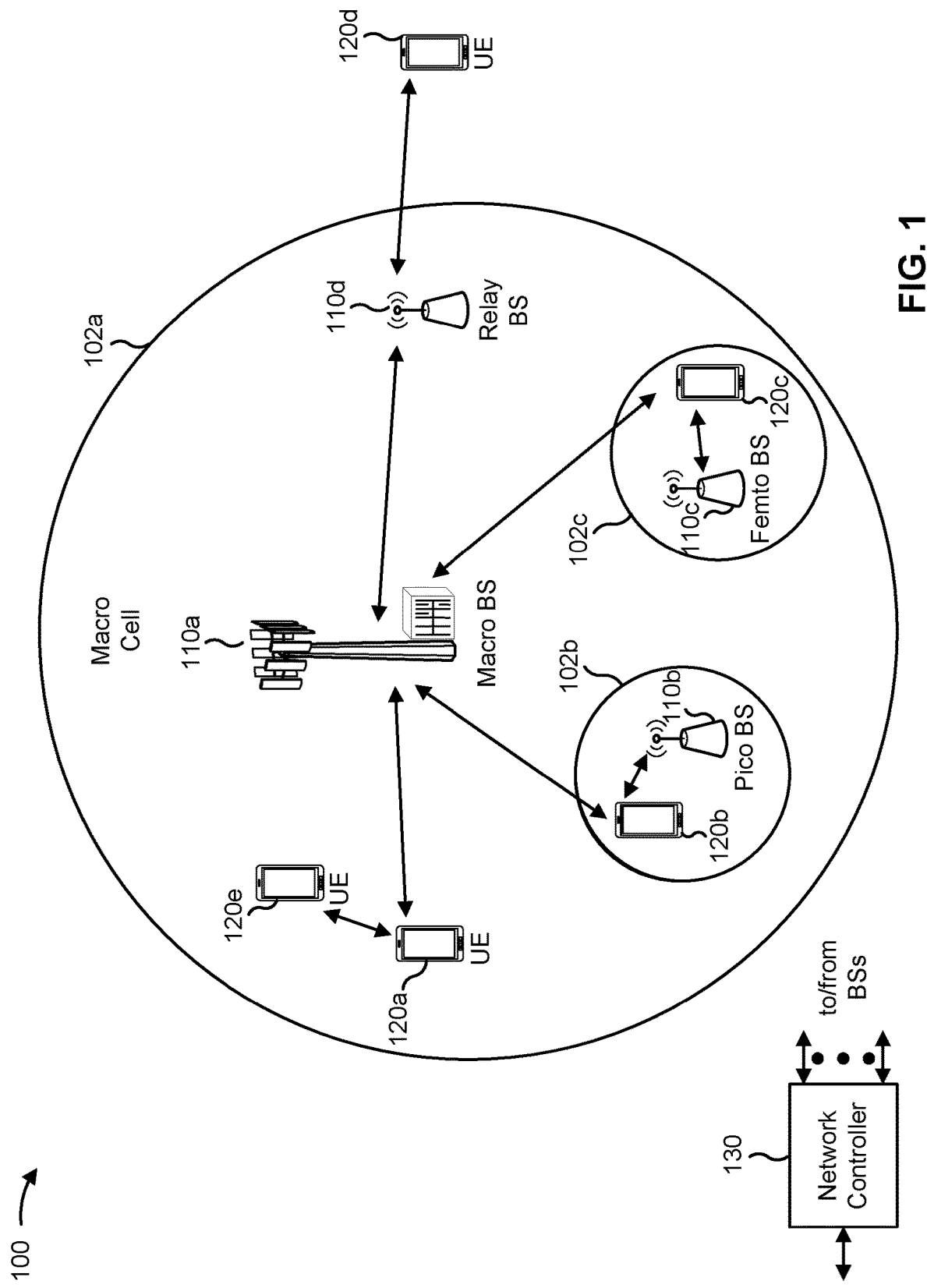
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
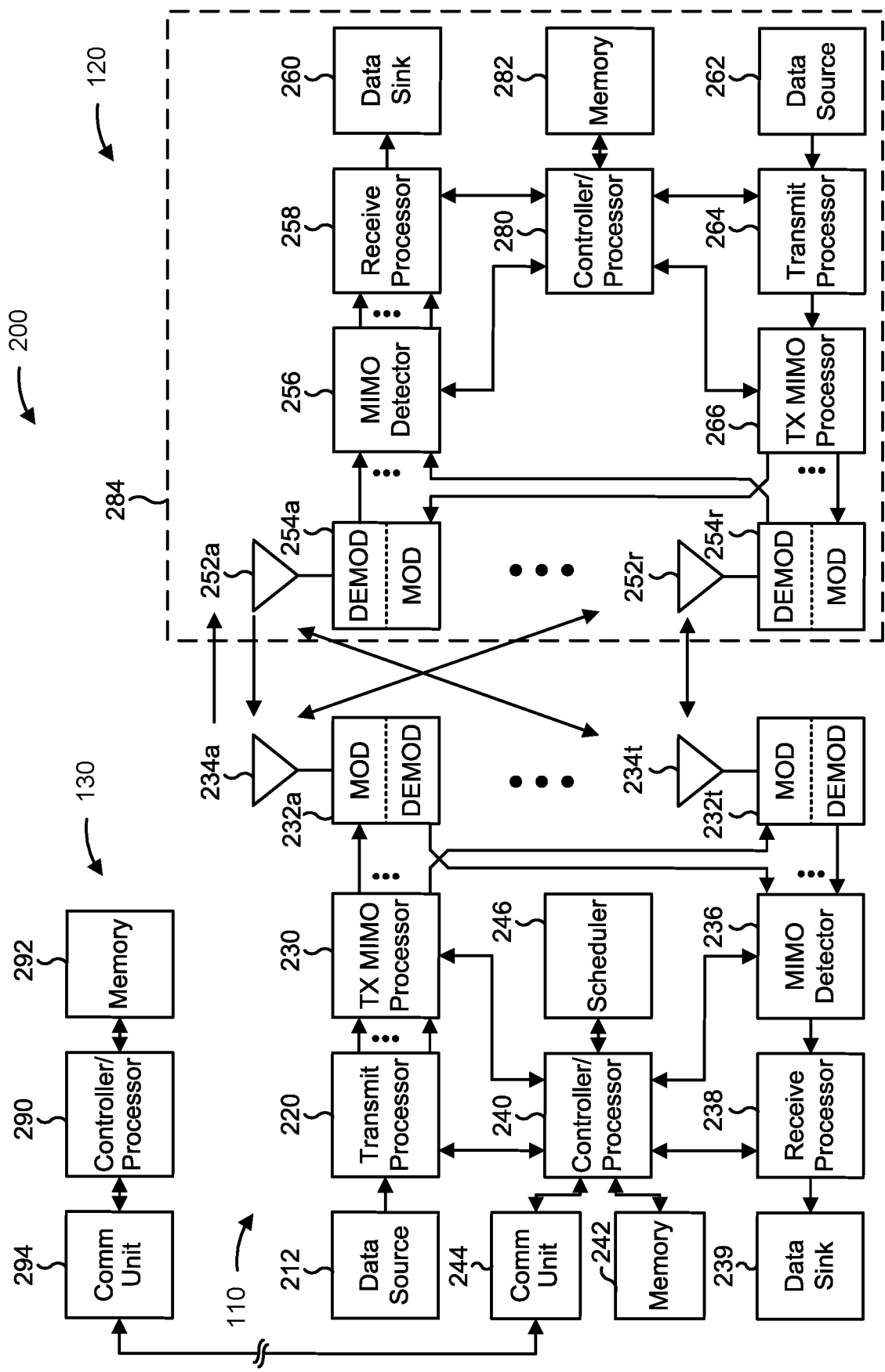
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with UE antenna prioritzation, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. The memory may store a computer program that provides instructions, when the computer program is executed. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions.

In some aspects, the UE 120 includes means for establishing a first communication link using a first radio access technology (RAT); means for establishing a second communication link using a second RAT; means for determining whether to prioritize antenna selection for the first communication link using the first RAT or the second communication link using the second RAT; and/or means for prioritizing antenna selection for the first communication link or the second communication link based at least in part on the determination. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for operating in a standalone mode on the first communication link using the first RAT; means for establishing the second communication link using the second RAT to establish a dual connectivity configuration; and/or means for determining to prioritize antenna selection for the first communication link using the first RAT as an initial configuration for the dual connectivity configuration. In some aspects, the UE 120 includes means for determining whether to prioritize antenna selection for the first communication link using the first RAT or the second communication link using the second RAT based at least in part on one or more antenna prioritization parameters. In some aspects, the UE 120 includes means for determining to prioritize antenna selection for the first communication link using the first RAT based at least in part on a determination that at least a subset of the one or more antenna prioritization parameters are satisfied.

In some aspects, the UE 120 includes means for determining to prioritize antenna selection for the second communication link using the second RAT based at least in part on a determination that at least a subset of the one or more antenna prioritization parameters are not satisfied. In some aspects, the UE 120 includes means for determining to prioritize antenna selection for the first communication link using the first RAT based at least in part on the service type associated with the first communication link being a VoLTE service or a VoNR service. In some aspects, the UE 120 includes means for determining to prioritize antenna selection for the first communication link using the first RAT based at least in part on a determination that the signal measurement associated with the first communication link does not satisfy a threshold.

In some aspects, the UE 120 includes means for determining to prioritize antenna selection for the second communication link using the second RAT based at least in part on a determination that the signal measurement associated with the first communication link satisfies a threshold. In some aspects, the UE 120 includes means for determining to prioritize antenna selection for the first communication link using the first RAT based at least in part on a determination that the difference in signal measurements between the transmit antenna for the first communication link and the non-transmit antenna for the first communication link satisfies a threshold.

In some aspects, the UE 120 includes means for determining to prioritize antenna selection for the second communication link using the second RAT based at least in part on a determination that the difference in signal measurements between the transmit antenna for the first communication link and the non-transmit antenna for the first communication link does not satisfy a threshold. In some aspects, the UE 120 includes means for determining to prioritize antenna selection for the first communication link using the first RAT; and/or means for selecting a first transmit antenna, of a plurality of antennas of the UE, for the first communication link; and/or means for selecting a second transmit antenna, of the plurality of antennas, for the second communication link, after selecting the first transmit antenna for the first communication link.

In some aspects, the UE 120 includes means for selecting, as the first transmit antenna, a preferred transmit antenna for the first communication link. In some aspects, the UE 120 includes means for selecting, as the second transmit antenna, a remaining antenna of the plurality of antennas for the first communication link, wherein the remaining antenna is different from the preferred transmit antenna. In some aspects, the UE 120 includes means for determining a sounding reference signal (SRS) alternative path for the second transmit antenna; and/or means for determining a blanking mask for the first communication link on the first transmit antenna based at least in part on the SRS alternative path for the second transmit antenna. In some aspects, the UE 120 includes means for refraining from switching antenna selection priority between the first communication link and the second communication link for a configured time period from determining to prioritize antenna selection for the first communication link.

In some aspects, the UE 120 includes means for determining to prioritize antenna selection for the second communication link using the second RAT; and/or means for selecting a first transmit antenna of a plurality of transmit antennas for the UE 120 for the second RAT; and/or means for selecting a second transmit antenna of the plurality of antennas for the first RAT after selecting the second transmit antenna for the second RAT. In some aspects, the UE 120 includes means for selecting, as the second transmit antenna, a preferred transmit antenna for the second communication link. In some aspects, the UE 120 includes means for selecting, as the first transmit antenna, a remaining antenna of the plurality of antennas for the second communication link, wherein the remaining antenna is different from the preferred transmit antenna.

In some aspects, the UE 120 includes means for determining an SRS alternative path for the second transmit antenna; and/or means for determining a blanking mask for the first communication link on the first transmit antenna based at least in part on the SRS alternative path for the second transmit antenna. In some aspects, the UE 120 includes means for refraining from switching antenna selection priority between the first communication link and the second communication link for a configured time period from determining to prioritize antenna selection for the second communication link.

In some aspects, the UE 120 includes means for determining to prioritize antenna selection for the first communication link using the first RAT based at least in part on a determination that a second highest RSRP measurement associated with the first communication link does not satisfy a threshold. In some aspects, the UE 120 includes means for determining to prioritize antenna selection for the second communication link using the second RAT based at least in part on a determination that a second highest RSRP measurement associated with the first communication link satisfies a threshold.

As indicated above, FIG. 2 is provided as an example. Other examples may differ from what is described with regard to FIG. 2.

Figure 3:
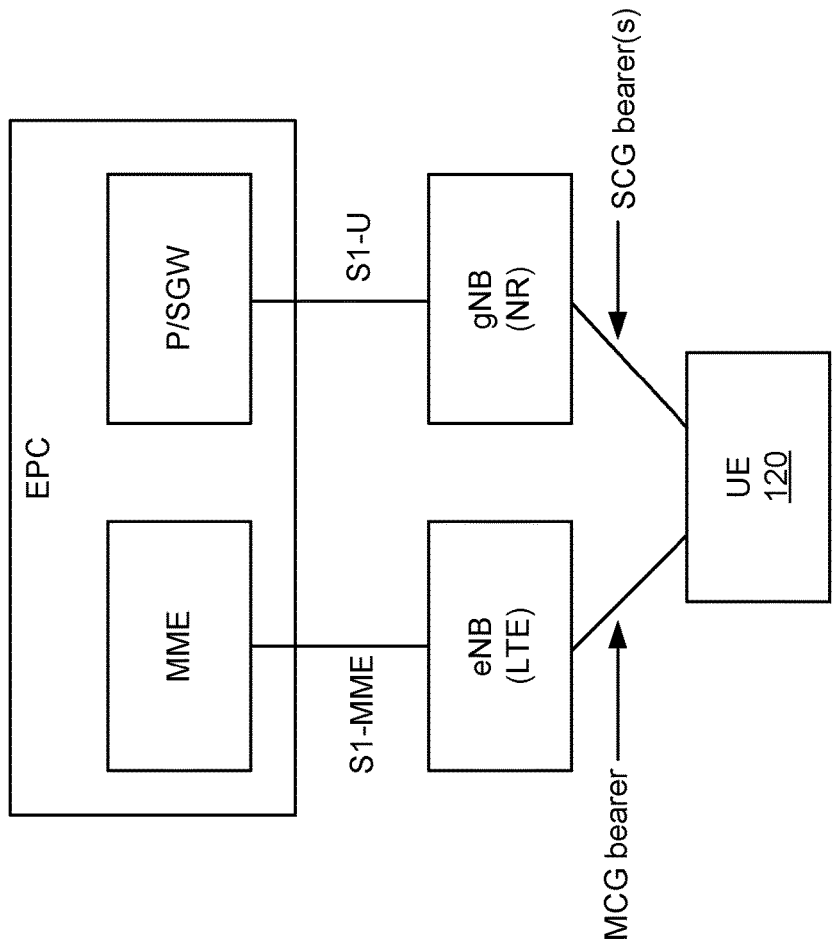
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT, and the SCG is associated with an NR RAT), an NR-E-UTRA dual connectivity (NEDC) mode (e.g., where the MCG is associated with an NR RAT, and the SCG is associated with an LTE RAT), an NR dual connectivity (NRDC) mode (e.g., where the MCG is associated with an NR RAT, and the SCG is also associated with the NR RAT), or another dual connectivity mode (e.g., where the MCG is associated with a first RAT, and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. The UE 120 may establish and communicate on a first communication link with the eNB using an LTE RAT and may establish and communicate on a second communication link with the gNB using an NR RAT. In FIG. 3, the PGW and the SGW are shown collectively as P/SGW. In some aspects, the eNB and the gNB may be co-located at the same base station 110. In some aspects, the eNB and the gNB may be included in different base stations 110 (i.e., may not be co-located).

As further shown in FIG. 3, in some aspects, a wireless network that permits operation in a 5G NSA mode may permit such operations using an MCG for a first RAT (e.g., an LTE RAT, a 4G RAT, and/or the like) and an SCG for a second RAT (e.g., an NR RAT, a 5G RAT, and/or the like). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NRDC). Alternatively, in some aspects, a UE 120 may be concurrently connected with one or more base stations 110 that use the same RAT (e.g., in the case of NRDC). In some aspects, the MCG may be associated with a first frequency band (e.g., a sub-6 GHz band and/or an FR1 band), and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be an SRB. An SRB may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
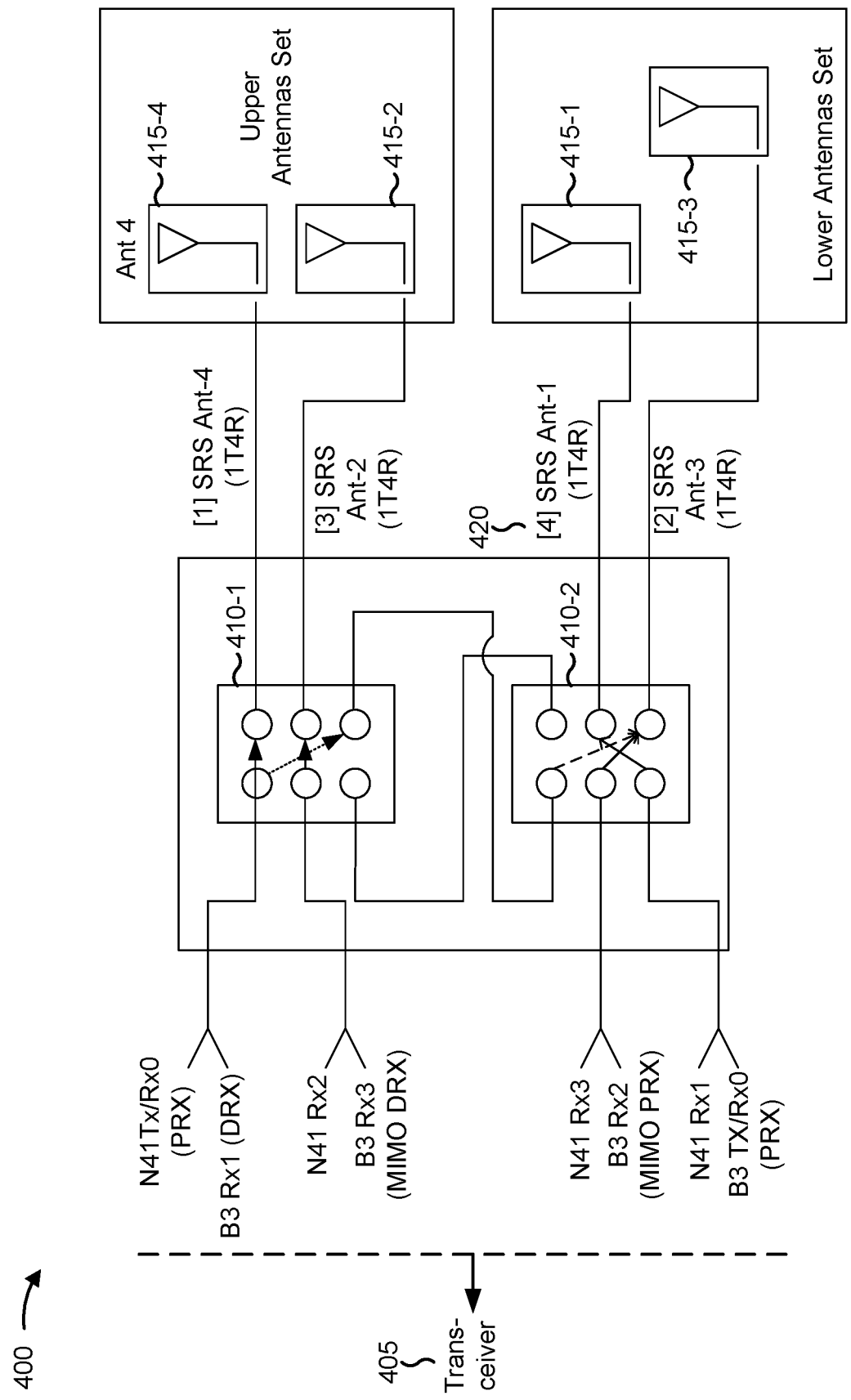
FIG. 4 is a diagram illustrating an example of a set of radio frequency (RF) chains of a UE, in accordance with the present disclosure.

FIG. 4 is a diagram illustrating an example 400 of a set of radio frequency (RF) chains of a UE, in accordance with the present disclosure. The RF chains of the UE may be part of an RF front-end of the UE, which may be shared across a plurality of different types of RATs such as LTE and NR. FIG. 4 shows a transceiver 405, a set of cross-switches 410-1 and 410-2, and a set of antennas 415-1 through 415-4. The set of antennas 415 are grouped into an upper antenna set, which may be situated in an upper region of the UE, and a lower antenna set, which may be situated in a lower region of the UE. Thus, antenna diversity is achieved in situations where one of the upper region, or the lower region of the UE may be impeded, for example, by a user's hand or other blockage.

A cross-switch 410 may provide for an input signal 420 to be switched from one antenna 415 to another antenna 415, or for a signal received from an antenna 415 to be switched from one receive path to another receive path. A cross-switch 410 may be a hardware component (e.g., a physical switch) or may be implemented in the baseband via precoding and/or the like. A cross-switch 410 may include, for example, an N-pole by M-throw cross-switch, a plurality of cascaded cross switches (e.g., a plurality of cascaded N-pole by M-throw cross-switches, X-pole by Y-pole cross-switches, and/or A-pole by B-pole cross-switches), or another configuration of cross-switches. A cross-switch configuration may indicate how signals are mapped to antennas by a cross-switch 410. In some aspects, a cross-switch 410 may implement an antenna switching configuration, such as an antenna switching diversity configuration, which may improve antenna diversity of transmissions of the UE.

An antenna 415 may be antenna 252 and/or the like. An antenna 415 can perform reception, transmission, or a combination thereof. For example, a RAT may be associated with one or more receive antennas and one or more transmit antennas. In example 400, there are two RATs: an LTE RAT associated with band B3, and an NR RAT associated with band N41. For example, the UE of example 400 may be associated with an ENDC configuration, wherein the LTE RAT is associated with a primary cell (PCell) and the NR RAT is associated with a primary secondary cell (PSCell). The NR RAT and the LTE RAT may both be associated with 4 receive antennas and 1 transmit antenna, which is denoted by 1T4R. Furthermore, each of the NR RAT and the LTE RAT may be associated with a primary receive (PRX) antenna.

Some transmissions may be performed using an antenna order. An antenna order may define an order in which antennas 415 are to be sequentially used to perform a transmission. As an example, an SRS may be transmitted using an antenna order in order to improve transmit diversity. An SRS is a signal used to sound parts of the spectrum that are not in use by an allocated resource block, in order for a base station to estimate channel quality. In the course of transmitting the SRS using the antenna order, the UE may switch an antenna used for a current physical uplink shared channel (PUSCH) to a different antenna used for reception in a current operating frequency channel (e.g., associated with an absolute radio-frequency channel number (ARFCN)). The base station may use the SRS for improve downlink precoding, thereby improving downlink multiple-input multiple-output (MIMO) performance. As an example of an antenna order, the SRS may be transmitted on antennas 415-4, 415-3, 415-2, and 415-1 in order, which may be represented by (4,3,2,1). In FIG. 4, the SRS antenna order is represented by the numbers in brackets (for example, the [4] shown by reference number 420 indicates that antenna 415-1 is a fourth antenna in the antenna order). The SRS transmission may be performed periodically (e.g., in accordance with a periodicity).

The UE of example 400 may share RF front end (RFFE) resources (e.g., cross-switch 410, antenna 415, and/or the like) between the LTE RAT and the NR RAT. In these cases, as an example, an LTE RAT communication link and an NR RAT communication link (e.g., in a sub-6 gigahertz (GHz) mid-band or high-band operating frequency) may share antennas 415, and may therefore share cross-switches 410. The RFFE resources may be shared across the LTE RAT and the NR RAT in various configurations. As an example, RFFE resources may be shared where the LTE RAT is 2-Rx antenna or 4-Rx antenna capable, and the NR RAT is 4-Rx antenna capable. As another example, RFFE resources may be shared where the LTE RAT and the NR RAT operate in various duplexing combinations, such as LTE RAT frequency division duplexing (FDD)+NR RAT time division duplexing (TDD), LTE RAT TDD+NR RAT TDD, LTE RAT TDD+NR RAT FDD, LTE RAT FDD+NR RAT FDD, and/or the like. As another example, RFFE resources may be shared where NR RAT SRS antenna switching is supported with or without LTE RAT Tx/Rx blanking. As another example, RFFE resources may be shared where subcarriers are aggregated (referred to as carrier aggregation) across the LTE RAT and/or the NR RAT. As another example, RFFE resources may be shared where the LTE RAT and the NR RAT are operated in a multi-subscriber identification module (MSIM) configuration.

In some aspects, the UE may configure the cross-switches 410 and/or the antennas 415 to support antenna switched diversity configurations for a plurality of communication links that operate on different types of RATs (e.g., a communication link using an LTE RAT and another communication link using an NR RAT). In these cases, the UE is capable of configuring combinations of antennas to be used for a particular type of RAT to support control signaling between the UE and a wireless network in a dual connectivity configuration (e.g., ENDC) to support SRS transmissions, to provide increased reliability and/or throughput on a communication link for a particular type of RAT, to decrease latency on a communication link for a particular type of RAT, and/or for other purposes.

Due to the RFFE resources of the UE being shared across a plurality of communication links for different types of RATs, in some cases the UE may determine that the preferred antennas or antenna combinations for the plurality of communication links are the same antennas or antenna combinations. Since an antenna may be assigned to only one communication link, the UE may be unable to determine which communication link is to be assigned the antenna. Assigning the antenna to a first communication link in some scenarios may lead to performance degradation on a second communication link, while assigning the antenna to the second communication link may lead to poor reliability and radio link failure (RLF) on the first communication link in other scenarios.

Some techniques and apparatuses described herein provide techniques and apparatus for UE antenna prioritization across a plurality of communication links. In some aspects, the communication links may operate on the same RAT or on different RATs (e.g., a first communication link may use an LTE RAT and a second communication link may use an NR RAT, the first communication link may use an NR RAT and the second communication link may use another NR RAT) in a dual connectivity configuration (e.g., ENDC, NRDC). In some aspects, a UE is capable of prioritizing the selection of antennas for communication links that share an RF front-end of the UE (e.g., that share RFFE resources).

For example, the UE may determine that a first communication link using a first RAT is to be prioritized and may accordingly, select the antenna(s) (e.g., may select the antenna switched diversity configuration) for the first communication link prior to selecting the antenna(s) (e.g., the antenna switched diversity configuration) for the second communication link. As another example, the UE may determine that the second communication link using the second RAT is to be prioritized and may accordingly select the antenna(s) (e.g., may select the antenna switched diversity configuration) for the second communication link prior to selecting the antenna(s) (e.g., the antenna switched diversity configuration) for the first communication link. Moreover, the UE is capable of reducing frequent switching (or ping-ponging) between the prioritization for different communication links by limiting switching between different communication links being prioritized until after a particular period of time.

In this way, the UE is capable of prioritizing the antennas across a plurality of communication links in a dual connectivity configuration (as well as in multi-connectivity configurations including three or more communication links). This enables the UE to select preferred antennas and/or antenna switched diversity configurations to increase coverage, increase performance, increase reliability, increase throughput, and/or decrease latency for various types of services and/or for various communication and coverage scenarios. For example, the UE may prioritize antenna selection for a communication link using an LTE RAT where a voice call (e.g., a voice over LTE (VoLTE) call) service is being provided. As another example, the UE may prioritize antenna selection for a communication link using an LTE RAT during heavy network signaling instances where there is RRC related signaling due to an RF band add/drop event, which may occur due to mobility or network loading in a dual connectivity configuration. As another example, the UE may prioritize antenna selection for a communication link using an NR RAT where coverage and/or antenna imbalance for another communication link using an LTE RAT are within associated thresholds.

As indicated above, FIG. 4 is provided as an example. Other examples may differ from what is described with regard to FIG. 4.

Figure 5:
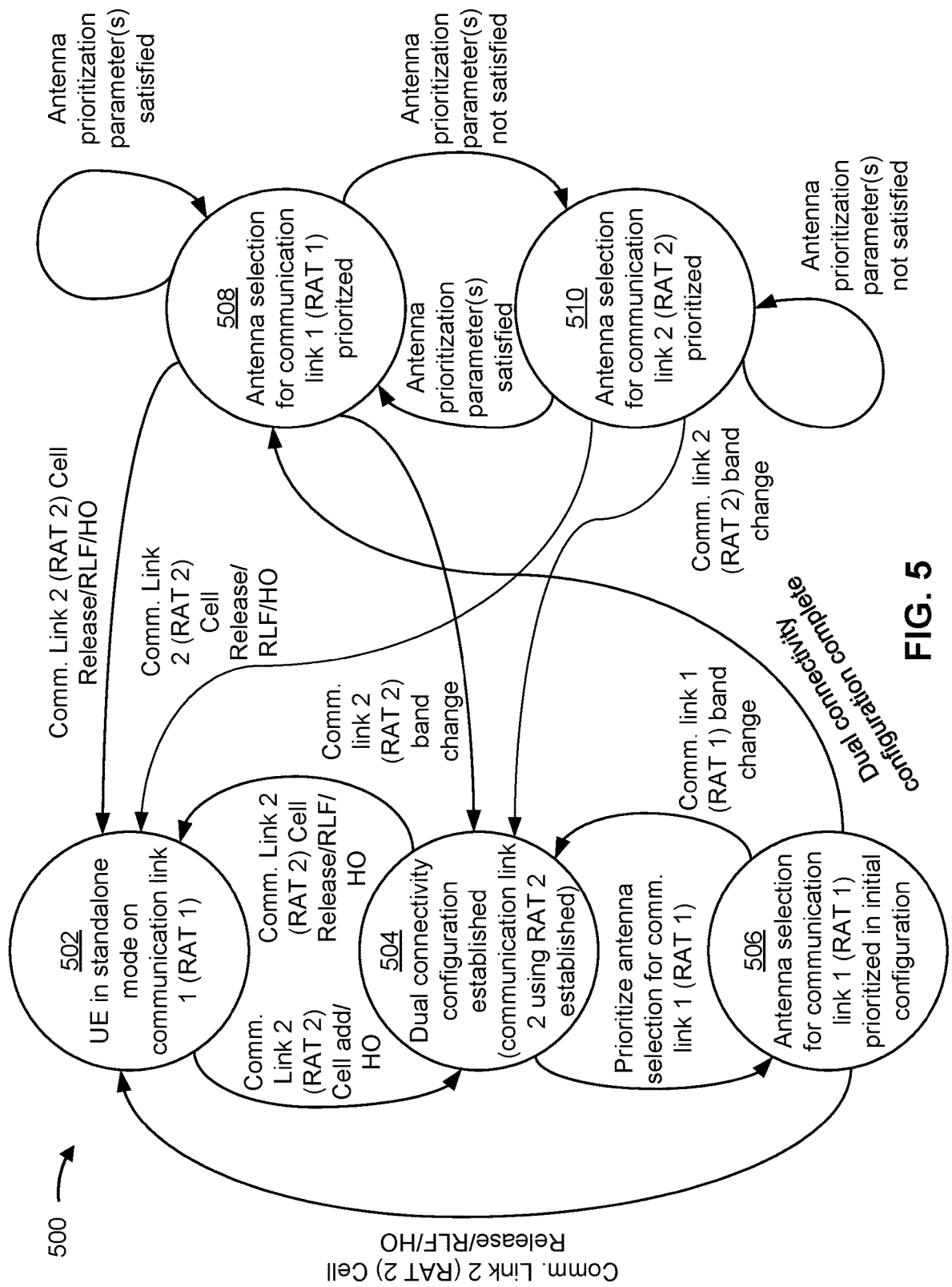
FIG. 5 is a diagram illustrating one or more examples associated with UE antenna prioritization, in accordance with the present disclosure.

FIG. 5 is a diagram illustrating one or more examples 500 associated with UE antenna prioritization, in accordance with the present disclosure. Example(s) 500 include a UE (e.g., UE 120) that is capable of operating in a dual connectivity configuration (e.g., an ENDC configuration or another type of dual connectivity configuration such as NRDC) on a plurality of communication links. Moreover, example(s) 500 include a UE that includes a shared RF front-end in which RFFE resources (e.g., cross-switches 410, antennas 415, and/or the like) are shared across the plurality of communication links.

In some aspects, two or more of the communication links use different types of RATs. For example, a first communication link (communication link 1) with an eNB (e.g., base station 110) may use an LTE RAT (RAT 1), and a second communication link (communication link 2) with a gNB may use an NR RAT (RAT 2). In some aspects, other types of dual connectivity configurations are supported, such as an NR RAT (RAT 1) and another NR RAT (RAT 2) (e.g., NRDC).

As shown in FIG. 5, the UE may operate in various modes associated with dual connectivity and/or antenna prioritization. As show by reference number 502, the UE may operate in a standalone mode on communication link 1 using RAT 1. In some aspects, the UE may establish communication link 1 by initiating a connection with a base station (e.g., by initiating a random access channel (RACH) procedure with the base station).

In this mode, the UE is not in a dual connectivity configuration and operates on communication link 1 only. In the standalone mode, the UE may select antennas for communication link 1 based on which antennas are preferred for communication link 1 and/or RAT 1. The UE may determine which antennas are preferred for communication link 1 (e.g., a preferred Tx antenna and/or a preferred Rx antenna) based at least in part on quality of service (QoS) parameters for RAT 1 and/or the type of service being provided on communication link 1 (e.g., a voice call service, a data session service, and/or another type of service), based at least in part on signal measurements on communication link 1 (e.g., RSRP measurements or another type of signal measurement using each of the plurality of antennas of the RF front-end of the UE), power headroom measurements, and/or other types of factors.

As further shown in FIG. 5, and by reference number 504, the UE may transition to a dual connectivity establishment mode, in which communication link 1 using RAT 1 and communication link 2 using RAT 2 are established for the UE. The UE may transition to the dual connectivity establishment mode by establishing communication link 2 using RAT 2. For example, the UE may add a cell of another base station by initiating a connection with the other base station (e.g., by performing another RACH procedure). As another example, the UE may perform a handover (HO) to the cell (e.g., from another cell) to transition to the dual connectivity establishment mode. In some aspects, during operation in the dual connectivity establishment mode, the UE may transition to the standalone mode on communication link 1 (reference number 502) based at least in part on cell release on communication link 2, a radio link failure on communication link 2, a handover to a different cell on communication link 2, and/or another event associated with communication link 2.

As shown by reference number 506, the UE may transition to an initial dual connectivity configuration (e.g., an initial antenna configuration for the dual connectivity configuration). The UE may prioritize antenna selection for communication link 1 to establish the initial dual connectivity configuration. In some aspects, the UE determines to prioritize the antenna selection for communication link 1 based at least in part on RAT 1 being an anchor RAT for the dual connectivity configuration (e.g., the RAT on which the main control signaling for the dual connectivity configuration is transmitted and/or received).

If, when operating in the initial dual connectivity configuration, a frequency band change occurs on communication link 1, the UE may transition back to establishment of the dual connectivity configuration (reference number 504).

Once the UE transitions back to establishment of the dual connectivity configuration, the UE may perform a joint retuning of the antennas for communication link 1 and communication link 2 such that communication link 1 and communication link 2 share the cross-switches and antennas of the UE's RF front-end. If, during operation in the initial dual connectivity configuration, the UE may transition to the standalone mode on communication link 1 (reference number 502) based at least in part on cell release on communication link 2, a radio link failure on communication link 2, a handover to a different cell on communication link 2, and/or another event associated with communication link 2.

The UE may prioritize antenna selection for communication link 1 by selecting a transmit antenna for communication link 1 and then selecting the transmit antenna for communication link 2. The UE selects the transmit antenna for communication link 2 to be different from the transmit antenna selected for communication link 1 such that the communication paths for communication link 1 and communication link 2 do not overlap. In this way, the UE may select the preferred transmit antenna for communication link 1 and selects one of the remaining antennas of the plurality of antennas of the UE's front-end for the transmit antenna of communication link 2. In some aspects, the preferred transmit antenna may be the transmit antenna that was used for communication link 1 while the UE was in the standalone mode, or may be another transmit antenna that is selected based at least in part on various factors such as signal measurements, the type of service being provided on communication link 1, power headroom measurements, and/or other parameters. The UE may select the transmit antenna for communication link 2 based at least in part on similar factors.

In some aspects, the UE may also select the preferred receive antenna for communication link 1 prior to selecting the transmit antenna for communication link 2 or may select the receive antenna for communication link 1 after selecting the transmit antenna for communication link 2. The UE may select the receive antenna for communication link 2 after selecting the receive antenna for communication link 1. In some aspects, for each selection option of the transmit antenna for communication link 2, the UE may determine the candidate antenna selections for the receive antenna of communication link 1 and the receive antenna of communication link 2 (e.g., that are different from the transmit antennas of communication link 1 and communication link 2). The UE may also check the receive antenna paths to validate that the RF front-end supports the receive antenna paths.

In some aspects, if the UE supports SRS antenna switching on communication link 2, the UE may determine an SRS alternative path for the transmit antenna of communication link 2, and may determine a blanking mask for communication link 1 on the transmit antenna of communication link 1 based at least in part on the SRS alternative path for the transmit antenna of communication link 1. If RAT 2 is an NR RAT, beam-based communication may be supported on communication link 2. The UE may transmit an SRS on communication link 2 so that the associated gNB may configure beams (e.g., transmit beams and/or receive beams) for the UE to use for communication link 2. If an SRS transmission on communication link 2 at least partially overlaps with transmission or reception on communication link 1, the transmission or reception on communication link 1 may cause interference with SRS transmission and/or may cause the SRS transmission to be postponed. Accordingly, the blanking mask may be used to blank or prevent transmission and/or reception on communication link 1 during transmission of an SRS on communication link 2. The blanking mask may identify each of the plurality of antennas of the UE's RF front-end. The blanking mask may further identify whether the UE is permitted to use each antenna for transmission and/or reception on communication link 1 during transmission of an SRS on communication link 2. The blanking mask may further identify what frequency bands open which the UE is permitted to transmit and/or receive during an SRS transmission on communication link 2.

The UE may prepare for a multi-request based joint retune between RAT 1 on communication link 1 and RAT 2 on communication link 2 to configure an antenna switched diversity configuration based at least in part on the selected antennas and the blanking mask. The UE may provide the signal path for communication link 1 a transmit antenna configuration and a receive antenna configuration to tune communication link 1, may provide the signal path for communication link 2 a transmit antenna configuration and a receive antenna configuration to tune communication link 2, may provide the signal path for communication link 2 an SRS alternative path for SRS antenna-switching, and/or may provide the signal path for communication link 2 the blanking mask for blanking during SRS transmission.

As further shown in FIG. 5, and by reference number 508, the UE may transition to a mode in which the antenna selection for communication link 1 is prioritized based at least in part on selecting the transmit and receive antennas for communication link 1 and communication link 2 as described above. Here, the UE may remain in the mode in which the antenna selection for communication link 1 is prioritized based at least in part on monitoring one or more antenna prioritization parameters. In particular, the UE may remain in the mode in which the antenna selection for communication link 1 is prioritized based at least in part on determining whether the one or more antenna prioritization parameters are satisfied.

The one or more antenna prioritization parameters may include a type of service being provided on communication link 1, one or more signal measurement thresholds for communication link 1, a power headroom measurement threshold for communication link 1, an antenna measurement differential threshold for communication link 1, and/or other parameters. As an example, the UE may determine to prioritize antenna selection for communication link 1 based at least in part on a voice call service (e.g., VoLTE or voice over NR (VoNR)) being provided on communication link 1 (e.g., Asdiv_ENDC_LTE_VoLTE parameter).

As another example, the UE may determine to prioritize antenna selection for communication link 1 based at least in part on determining that a signal measurement (e.g., an RSRP measurement, an RSSI measurement, an RSRQ measurement, a CQI measurement, and/or another type of signal measurement) on communication link 1 satisfies the signal measurement threshold (e.g., an Asdiv_ENDC_LTE_rsrp parameter). In some aspects, the signal measurement is a highest RSRP measurement associated with an antenna of the UE on communication link 1.

As another example, the UE may determine to prioritize antenna selection for communication link 1 based at least in part on determining that a power headroom measurement for communication link 1 satisfies the power headroom measurement threshold. The power headroom on communication link 1 may be a transmit power headroom relative to the UE's maximum transmit power limit for a given frequency band. For example, if the UE's maximum transmit power is 23 dBm, and the UE's normalized transmit power is 20 dBm, the UE may determine that the power headroom on communication link 1 is 3 dB. The UE's average transmit power headroom may be normalized per resource block over a period of time, such as 320 ms or 640 ms for example. The UE may determine whether the power headroom or average power headroom of the UE satisfies the power headroom measurement.

As another example, the UE may determine to prioritize antenna selection for communication link 1 based at least in part on determining that an antenna measurement differential on communication link 1 satisfies the antenna measurement differential threshold (e.g., Asdiv_ENDC_LTE rsrpdelta) on communication link 1. The antenna measurement differential may correspond to a difference in signal measurements between the selected transmit antenna for communication link 1 and a non-transmit antenna (e.g., a receive antenna) for communication link 1. The UE may evaluate the signal measurements over a particular time period (e.g., every 640 ms) and may use filtered measurements. The signal measurements may include RSRP measurements, RSSI measurements, RSRQ measurements, CQI measurements, and/or other signal measurements.

In some aspects, the UE determines to prioritize antenna selection for communication link 1 or communication link 2 based at least in part on a combination of antenna prioritization parameters. For example, the UE may determine to prioritize antenna selection for communication link 1 or communication link 2 based at least in part on a combination of the signal measurement associated with communication link 1 and the antenna measurement differential on communication link 1. Alternatively, the UE may determine to prioritize antenna selection for communication link 1 or communication link 2 based at least in part on whether a second highest signal measurement on communication link 1 (e.g., an RSRP measurement using the antenna on communication link 1) satisfies the signal measurement threshold. This may simplify the determination and may reduce or prevent frequent and/or rapid flip-flopping between the prioritization of communication link 1 and the prioritization of communication link 2 that might otherwise occur in scenarios in which the highest RSRP of the UE may dither between satisfying the signal measurement threshold and not satisfying the signal measurement threshold. Moreover, a determination that the second highest signal measurement on communication link 1 does not satisfy the signal measurement threshold may be an indication that there are no good candidate antennas for communication link 1, in which case the UE may prioritize antenna selection for communication link 1.

In some aspects, during operation in the mode in which the antenna selection for communication link 1 is prioritized, the UE may transition to the standalone mode on communication link 1 (reference number 502) based at least in part on cell release on communication link 2, a radio link failure on communication link 2, a handover to a different cell on communication link 2, and/or another event associated with communication link 2. In some aspects, during operation in the mode in which the antenna selection for communication link 1 is prioritized, the UE may transition to the dual connectivity connection establishment mode (reference number 504) based at least in part on a frequency band change on communication link 2.

As further shown in FIG. 5, and by reference number 510, if the UE determines that all or a subset of the one or more antenna prioritization parameters described above are not satisfied, the UE may transition to a mode in which antenna selection for communication link 2 is prioritized (e.g., prioritized over antenna selection for communication link 1). In this mode, the UE may retune the antenna configurations (e.g., the antenna switched diversity configurations) for communication link 1 and communication link 2 such that the preferred transmit antenna for communication link 2 is selected for communication link 2. Once the antenna selection for communication link 2 has been prioritized, the UE may remain in the mode in which the antenna selection for communication link 2 is prioritized based at least in part on monitoring one or more antenna prioritization parameters. In particular, the UE may remain in the mode in which the antenna selection for communication link 2 is prioritized based at least in part on determining that all or a subset of the one or more antenna prioritization parameters described above are not satisfied.

In some aspects, during operation in the mode in which the antenna selection for communication link 2 is prioritized, the UE may transition to the standalone mode on communication link 1 (reference number 502) based at least in part on cell release on communication link 2, a radio link failure on communication link 2, a handover to a different cell on communication link 2, and/or another event associated with communication link 2. In some aspects, during operation in the mode in which the antenna selection for communication link 2 is prioritized, the UE may transition to the dual connectivity connection establishment mode (reference number 504) based at least in part on a frequency band change on communication link 2.

The UE may prioritize antenna selection for communication link 2 by selecting a transmit antenna for communication link 2 and then selecting the transmit antenna for communication link 1. The UE selects the transmit antenna for communication link 1 to be different from the transmit antenna selected for communication link 2 such that the communication paths for communication link 1 and communication link 2 do not overlap. In this way, the UE may select the preferred transmit antenna for communication link 2 and may select one of the remaining antennas of the plurality of antennas of the UE's shared front-end for the transmit antenna of communication link 1. In some aspects, the UE may determine the preferred transmit antenna for communication link 2 based at least in part on various factors such as signal measurements, the type of service being provided on communication link 2, power headroom measurements, and/or other parameters. The UE may select the transmit antenna for communication link 1 based at least in part on similar factors.

In some aspects, the UE may also select the preferred receive antenna for communication link 2 prior to selecting the transmit antenna for communication link 1 or may select the receive antenna for communication link 2 after selecting the transmit antenna for communication link 1. The UE may select the receive antenna for communication link 1 after selecting the receive antenna for communication link 2. In some aspects, for each selection option of the transmit antenna for communication link 1, the UE may determine the candidate antenna selections for the receive antenna of communication link 1 and the receive antenna of communication link 2 (e.g., that are different from the transmit antennas of communication link 1 and communication link 2). The UE may also check the receive antenna paths to validate that the RF front-end supports the receive antenna paths.

In some aspects, if the UE supports SRS antenna switching on communication link 2, the UE may determine an SRS alternative path for the transmit antenna of communication link 2, and may determine a blanking mask for communication link 1 on the transmit antenna of communication link 1 based at least in part on the SRS alternative path for the transmit antenna of communication link 2. The blanking mask may identify each of the plurality of antennas of the UE's RF front-end. The blanking mask may further identify whether the UE is permitted to use each antenna for transmission and/or reception on communication link 1 during transmission of an SRS on communication link 2. The blanking mask may further identify what frequency bands upon which the UE is permitted to transmit and/or receive during an SRS transmission on communication link 2.

The UE may prepare for a multi-request based joint retune between RAT 1 on communication link 1 and RAT 2 on communication link 2 to configure an antenna switched diversity configuration based at least in part on the selected antennas and the blanking mask. The UE may provide the signal path for communication link 1 a transmit antenna configuration and a receive antenna configuration to tune communication link 1. The UE may provide the signal path for communication link 2 a transmit antenna configuration and a receive antenna configuration to tune communication link 2. The UE may provide the signal path for communication link 2 an SRS alternative path for SRS antenna-switching. The UE may provide the signal path for communication link 2 the blanking mask for blanking during SRS transmission.

In some aspects, the UE may implement a hysteresis timer to prevent frequent switching between antenna selection being prioritized for communication link 1 and antenna selection being prioritized for communication link 2. In these examples, after switching between antenna selection being prioritized for communication link 1 and antenna selection being prioritized for communication link 2, the UE may refrain from switching antenna selection priority between communication link 1 and communication link 2 again for a configured time period.

In this way, the UE is capable of prioritizing the antennas across a plurality of communication links in a dual connectivity configuration (as well as in multi-connectivity configurations including three or more communication links). This enables the UE to select preferred antennas and/or antenna switched diversity configurations to increase coverage, increase performance, increase reliability, increase throughput, and/or decrease latency in various communication and coverage scenarios.

As indicated above, FIG. 5 is provided as one or more examples. Other examples may differ from what is described with respect to FIG. 5.

FIG. 6 is a diagram illustrating examples of transmit/receive blanking, in accordance with the present disclosure. In particular, FIG. 6 is a diagram illustrating example blanking masks for communication link 1 using RAT 1 (e.g., an LTE RAT or another type of anchor RAT) that may be used for transmission/reception blanking during SRS transmissions on communication link 2 using RAT 2 (e.g., an NR RAT) in a dual connectivity configuration. Other example blanking masks may be used (e.g., for NRDC).

As shown in FIG. 6, example blanking mask 610, example blanking mask 620, example blanking mask 630, and example blanking 640 may each provide an example blanking mask configuration for different transmit antenna selections for a communication link 1. In particular, example blanking mask 610 provides an example blanking mask configuration for antenna 1 of the UE's shared RF front-end, example blanking mask 620 provides an example blanking mask configuration for antenna 2 of the UE's shared RF front-end, example blanking mask 630 provides an example blanking mask configuration for antenna 3 of the UE's shared RF front-end, and example blanking mask 640 provides an example blanking mask configuration for antenna 4 of the UE's shared RF front-end.

As shown in FIG. 6, in each of the example blanking masks 610-640, the UE is configured to refrain from transmitting and receiving on communication link 1 using RAT 1 during an SRS transmission on the antenna on which the SRS transmission is to be performed on communication link 2 using RAT 2. Moreover, in each of the example blanking masks 610-640, the UE may be permitted to transmit and/or receive on communication link 1 using RAT 1 during an SRS transmission on other antennas than the antenna on which the SRS transmission is to be performed on communication link 2 using RAT 2. Moreover, each of the example blanking masks 610-640 may specify the frequency bands on which the UE may transmit and/or receive on communication link 1 using RAT 1 (e.g., Rx12, Rx13, Rx01, and/or the like).

As indicated above, FIG. 6 is provided as one or more examples. Other examples may differ from what is described with respect to FIG. 6.

Figure 7:
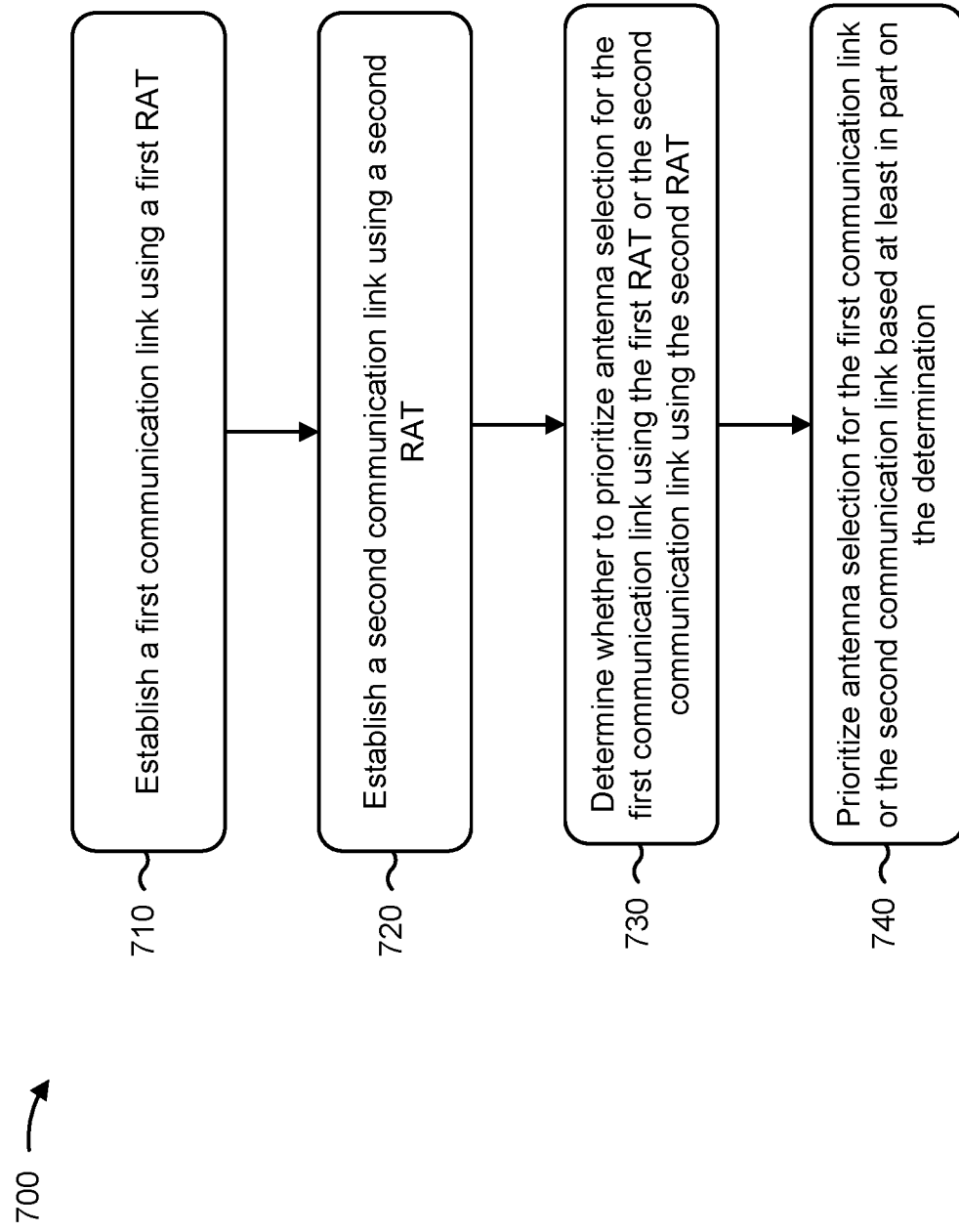
FIG. 7 is a diagram illustrating an example process associated with UE antenna prioritization, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for UE antenna prioritization.

As shown in FIG. 7, in some aspects, process 700 may include establishing a first communication link using a first RAT (block 710). For example, the UE (e.g., using link establishment component 808, depicted in FIG. 8) may establish a first communication link using a first RAT, as described above.

As further shown in FIG. 7, in some aspects, process 700 may include establishing a second communication link using a second RAT (block 720). For example, the UE (e.g., using link establishment component 808, depicted in FIG. 8) may establish a second communication link using a second RAT, as described above.

As further shown in FIG. 7, in some aspects, process 700 may include determining whether to prioritize antenna selection for the first communication link using the first RAT or the second communication link using the second RAT (block 730). For example, the UE (e.g., using determination component 810, depicted in FIG. 8) may determine whether to prioritize antenna selection for the first communication link using the first RAT or the second communication link using the second RAT, as described above.

As further shown in FIG. 7, in some aspects, process 700 may include prioritizing antenna selection for the first communication link or the second communication link based at least in part on the determination (block 740). For example, the UE (e.g., using prioritization component 812, depicted in FIG. 8) may prioritize antenna selection for the first communication link or the second communication link based at least in part on the determination, as described above.

Process 700 may include additional aspects, such as any single aspect or any combination of aspects described below and/or in connection with one or more other processes described elsewhere herein.

In a first aspect, process 700 includes operating in a standalone mode on the first communication link using the first RAT, wherein establishing the second communication link comprises establishing the second communication link using the second RAT to establish a dual connectivity configuration, and wherein determining whether to prioritize antenna selection for the first communication link using the first RAT or the second communication link using the second RAT comprises determining to prioritize antenna selection for the first communication link using the first RAT as an initial configuration for the dual connectivity configuration. In a second aspect, alone or in combination with the first aspect, the dual connectivity configuration comprises an ENDC configuration or an NRDC configuration. In a third aspect, alone or in combination with one or more of the first and second aspects, determining whether to prioritize antenna selection for the first communication link using the first RAT or the second communication link using the second RAT comprises determining whether to prioritize antenna selection for the first communication link using the first RAT or the second communication link using the second RAT based at least in part on one or more antenna prioritization parameters.

In a fourth aspect, alone or in combination with one or more of the first through third aspects, determining whether to prioritize antenna selection for the first communication link using the first RAT or the second communication link using the second RAT comprises determining to prioritize antenna selection for the first communication link using the first RAT based at least in part on a determination that at least a subset of the one or more antenna prioritization parameters are satisfied. In a fifth aspect, alone or in combination with one or more of the first through fourth aspects, determining whether to prioritize antenna selection for the first communication link using the first RAT or the second communication link using the second RAT comprises determining to prioritize antenna selection for the second communication link using the second RAT based at least in part on a determination that at least a subset of the one or more antenna prioritization parameters are not satisfied.

In a sixth aspect, alone or in combination with one or more of the first through fifth aspects, the one or more antenna prioritization parameters include at least one of a service type associated with the first communication link, a signal measurement associated with the first communication link, or a difference in signal measurements between a transmit antenna for the first communication link and a non-transmit antenna for the first communication link. In a seventh aspect, alone or in combination with one or more of the first through sixth aspects, determining whether to prioritize antenna selection for the first communication link using the first RAT or the second communication link using the second RAT comprises determining to prioritize antenna selection for the first communication link using the first RAT based at least in part on the service type associated with the first communication link being a VoLTE service or a VoNR service.

In an eighth aspect, alone or in combination with one or more of the first through seventh aspects, determining whether to prioritize antenna selection for the first communication link using the first RAT or the second communication link using the second RAT comprises determining to prioritize antenna selection for the first communication link using the first RAT based at least in part on a determination that the signal measurement associated with the first communication link does not satisfy a threshold. In a ninth aspect, alone or in combination with one or more of the first through eighth aspects, determining whether to prioritize antenna selection for the first communication link using the first RAT or the second communication link using the second RAT comprises determining to prioritize antenna selection for the second communication link using the second RAT based at least in part on a determination that the signal measurement associated with the first communication link satisfies a threshold.

In a tenth aspect, alone or in combination with one or more of the first through ninth aspects, determining whether to prioritize antenna selection for the first communication link using the first RAT or the second communication link using the second RAT comprises determining to prioritize antenna selection for the first communication link using the first RAT based at least in part on a determination that the difference in signal measurements between the transmit antenna for the first communication link and the non-transmit antenna for the first communication link satisfies a threshold. In an eleventh aspect, alone or in combination with one or more of the first through tenth aspects, determining whether to prioritize antenna selection for the first communication link using the first RAT or the second communication link using the second RAT comprises determining to prioritize antenna selection for the second communication link using the second RAT based at least in part on a determination that the difference in signal measurements between the transmit antenna for the first communication link and the non-transmit antenna for the first communication link does not satisfy a threshold.

In a twelfth aspect, alone or in combination with one or more of the first through eleventh aspects, determining whether to prioritize antenna selection for the first communication link using the first RAT or the second communication link using the second RAT comprises determining to prioritize antenna selection for the first communication link using the first RAT, and wherein the method further comprises selecting a first transmit antenna, of a plurality of antennas of the UE, for the first communication link, and selecting a second transmit antenna, of the plurality of antennas, for the second communication link, after selecting the first transmit antenna for the first communication link. In a thirteenth aspect, alone or in combination with one or more of the first through twelfth aspects, selecting the first transmit antenna for the first communication link comprises selecting, as the first transmit antenna, a preferred transmit antenna for the first communication link.

In a fourteenth aspect, alone or in combination with one or more of the first through thirteenth aspects, selecting the second transmit antenna for the second communication link after selecting the first transmit antenna for the first communication comprises selecting, as the second transmit antenna, a remaining antenna of the plurality of antennas for the first communication link, wherein the remaining antenna is different from the preferred transmit antenna. In a fifteenth aspect, alone or in combination with one or more of the first through fourteenth aspects, process 700 includes determining an SRS alternative path for the second transmit antenna, and determining a blanking mask for the first communication link on the first transmit antenna based at least in part on the SRS alternative path for the second transmit antenna.

In a sixteenth aspect, alone or in combination with one or more of the first through fifteenth aspects, process 700 includes refraining from switching antenna selection priority between the first communication link and the second communication link for a configured time period from determining to prioritize antenna selection for the first communication link. In a seventeenth aspect, alone or in combination with one or more of the first through sixteenth aspects, determining whether to prioritize antenna selection for the first communication link using the first RAT or the second communication link using the second RAT comprises determining to prioritize antenna selection for the second communication link using the second RAT, and wherein the method further comprises selecting a first transmit antenna of a plurality of antennas for the UE for the second RAT, and selecting a second transmit antenna of the plurality of antennas for the first RAT after selecting the second transmit antenna for the second RAT.

In an eighteenth aspect, alone or in combination with one or more of the first through seventeenth aspects, selecting the first transmit antenna for the second communication link comprises selecting, as the first transmit antenna, a preferred transmit antenna for the second communication link. In a nineteenth aspect, alone or in combination with one or more of the first through eighteenth aspects, selecting the second transmit antenna for the first communication link after selecting the first transmit antenna for the second communication link comprises selecting, as the second transmit antenna, a remaining antenna of the plurality of antennas for the second communication link, wherein the remaining antenna is different from the preferred transmit antenna.

In a twentieth aspect, alone or in combination with one or more of the first through nineteenth aspects, process 700 includes determining an SRS alternative path for the second transmit antenna, and determining a blanking mask for the first communication link on the first transmit antenna based at least in part on the SRS alternative path for the second transmit antenna. In a twenty-first aspect, alone or in combination with one or more of the first through twentieth aspects, process 700 includes refraining from switching antenna selection priority between the first communication link and the second communication link for a configured time period from determining to prioritize antenna selection for the second communication link.

In a twenty-second aspect, alone or in combination with one or more of the first through twenty-first aspects, the first RAT comprises an LTE RAT and the second RAT comprises an NR RAT. In a twenty-third aspect, alone or in combination with one or more of the first through twenty-second aspects, the first RAT and the second RAT share an RF front-end of the UE.

In a twenty-fourth aspect, alone or in combination with one or more of the first through twenty-third aspects, determining whether to prioritize antenna selection for the first communication link using the first RAT or the second communication link using the second RAT comprises determining to prioritize antenna selection for the first communication link using the first RAT based at least in part on a determination that the signal measurement associated with the first communication link does not satisfy a threshold. In a twenty-fifth aspect, alone or in combination with one or more of the first through twenty-fourth aspects, determining whether to prioritize antenna selection for the first communication link using the first RAT or the second communication link using the second RAT comprises determining to prioritize antenna selection for the second communication link using the second RAT based at least in part on a determination that the signal measurement associated with the first communication link satisfies a threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
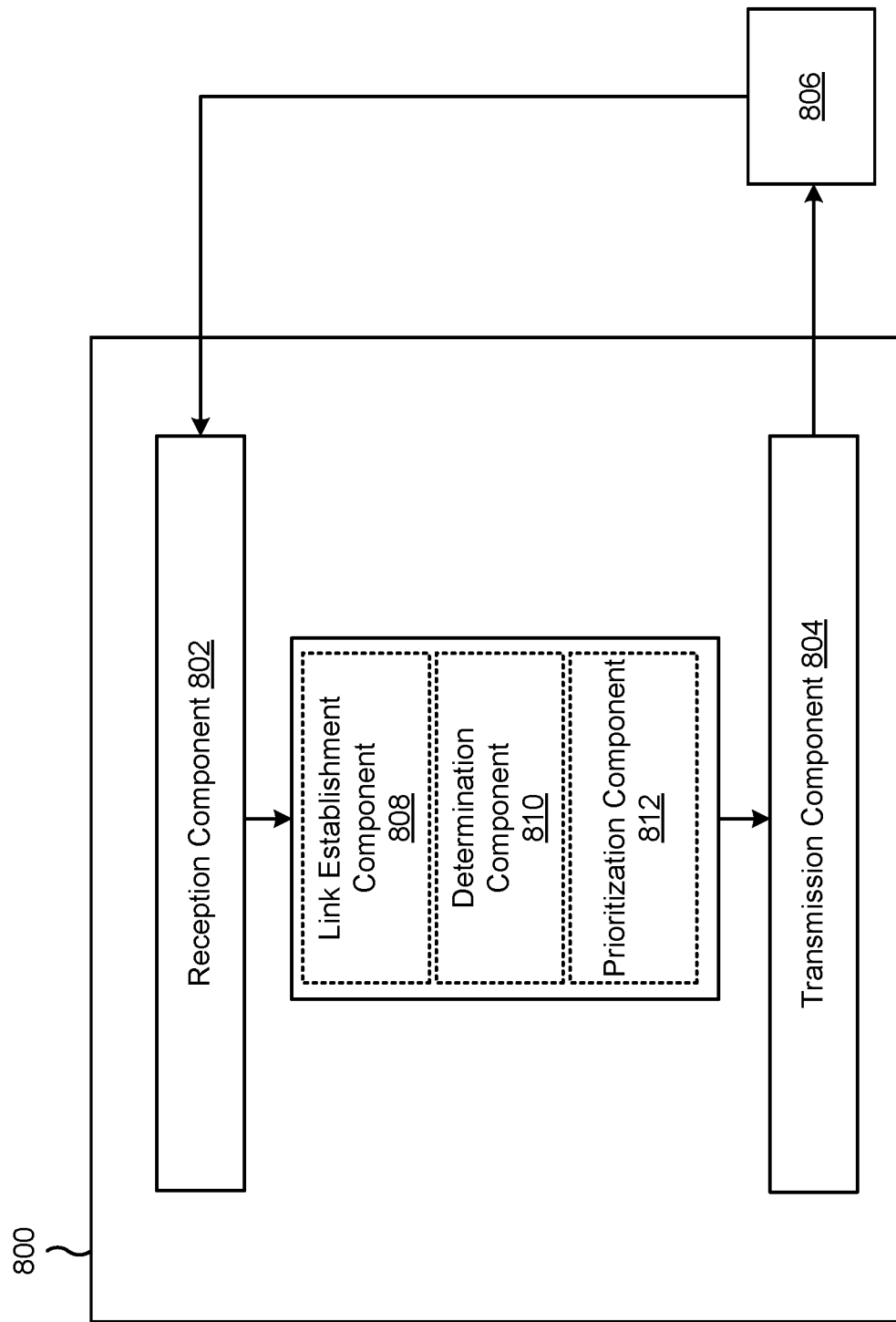
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a link establishment component 808, a determination component 810, or a prioritization component 812, among other examples.

In some aspects, the apparatus 800 may be configured to perform one or more operations described herein in connection with FIGS. 5 and/or 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The link establishment component 808 may establish a first communication link using a first RAT. The link establishment component 808 may establish a second communication link using a second RAT. In some aspects, the link establishment component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 810 may determine whether to prioritize antenna selection for the first communication link using the first RAT or the second communication link using the second RAT. In some aspects, the determination component 810 may include a receive processor, a transmit processor, a controller/processor, a memory, or a combination thereof, of the UE described above in connection with FIG. 2. The prioritization component 812 may prioritize antenna selection for the first communication link or the second communication link based at least in part on the determination. In some aspects, the prioritization component 812 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 802 and/or the transmission component 804 may operate in a standalone mode on the first communication link using the first RAT. The determination component 810 may determine an SRS alternative path for the second transmit antenna. The determination component 810 may determine a blanking mask for the first communication link on the first transmit antenna based at least in part on the SRS alternative path for the second transmit antenna. The prioritization component 812 may refrain from switching antenna selection priority between the first communication link and the second communication link for a configured time period from determining to prioritize antenna selection for the first communication link.

The determination component 810 may determine an SRS alternative path for the second transmit antenna. The determination component 810 may determine a blanking mask for the first communication link on the first transmit antenna based at least in part on the SRS alternative path for the second transmit antenna. The prioritization component 812 may refrain from switching antenna selection priority between the first communication link and the second communication link for a configured time period from determining to prioritize antenna selection for the second communication link.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
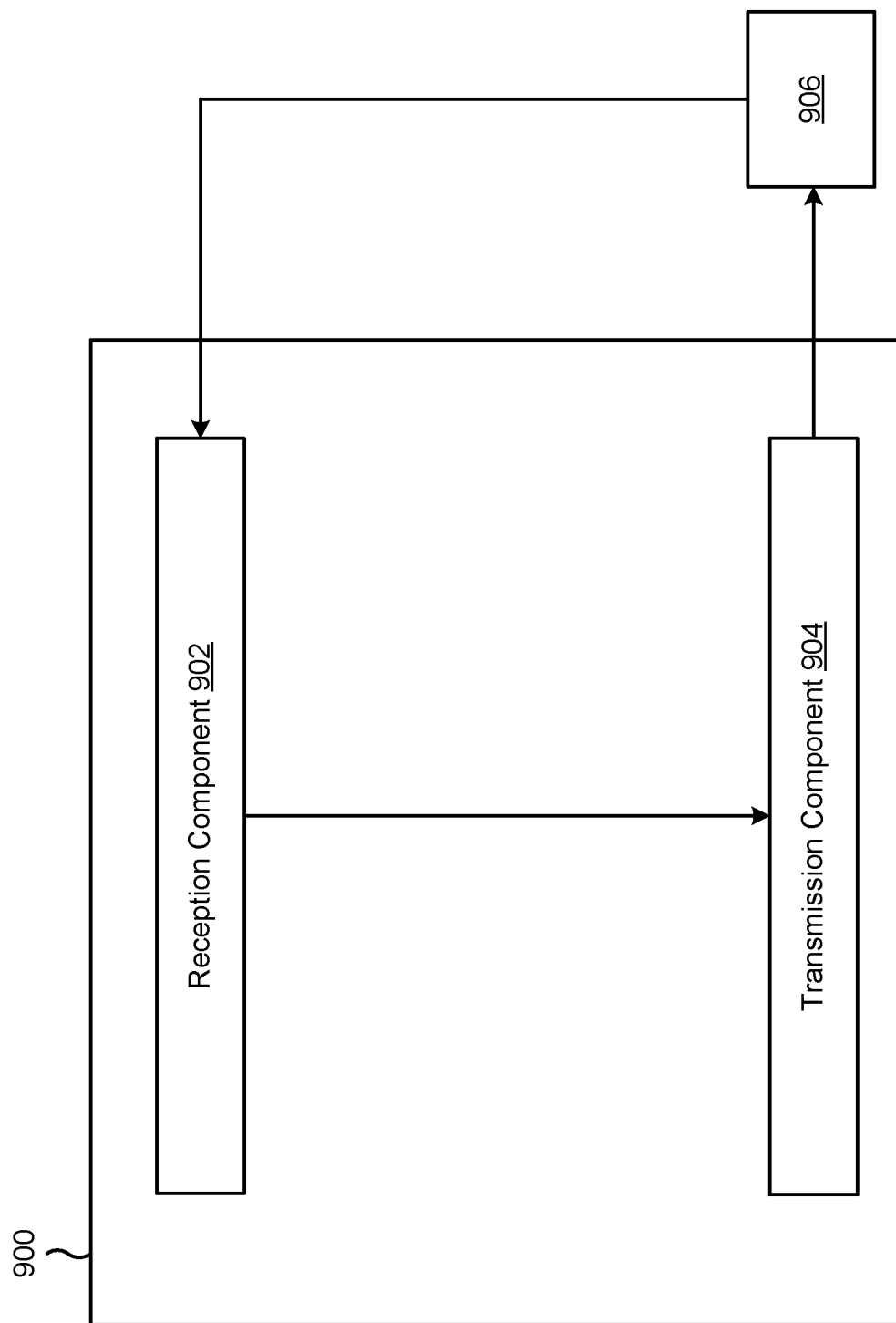

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 5 and 6. Additionally, or alternatively, the apparatus 900 may be configured to perform one or more processes described herein. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: establishing a first communication link using a first radio access technology (RAT); establishing a second communication link using a second RAT; determining whether to prioritize antenna selection for the first communication link using the first RAT or the second communication link using the second RAT; and prioritizing antenna selection for the first communication link or the second communication link based at least in part on the determination.

Aspect 2: The method of Aspect 1, further comprising: operating in a standalone mode on the first communication link using the first RAT; wherein establishing the second communication link comprises: establishing the second communication link using the second RAT to establish a dual connectivity configuration; and wherein determining whether to prioritize antenna selection for the first communication link using the first RAT or the second communication link using the second RAT comprises: determining to prioritize antenna selection for the first communication link using the first RAT as an initial configuration for the dual connectivity configuration. wherein establishing the second communication link comprises: establishing the second communication link using the second RAT to establish a dual connectivity configuration; and wherein determining whether to prioritize antenna selection for the first communication link using the first RAT or the second communication link using the second RAT comprises: determining to prioritize antenna selection for the first communication link using the first RAT as an initial configuration for the dual connectivity configuration.

Aspect 3: The method of Aspect 2, wherein the dual connectivity configuration comprises an Evolved Universal Mobile Telecommunications System Terrestrial Radio Access Network (E-UTRAN) NR dual connectivity (ENDC) configuration, or wherein the dual connectivity configuration comprises a New Radio dual connectivity (NRDC) configuration. Aspect 4: The method of any of Aspects 1-3, wherein determining whether to prioritize antenna selection for the first communication link using the first RAT or the second communication link using the second RAT comprises: determining whether to prioritize antenna selection for the first communication link using the first RAT or the second communication link using the second RAT comprises based at least in part on one or more antenna prioritization parameters. Aspect 5: The method of Aspect 4, wherein determining whether to prioritize antenna selection for the first communication link using the first RAT or the second communication link using the second RAT comprises: determining to prioritize antenna selection for the first communication link using the first RAT based at least in part on a determination that at least a subset of the one or more antenna prioritization parameters are satisfied.

Aspect 6: The method of Aspect 4, wherein determining whether to prioritize antenna selection for the first communication link using the first RAT or the second communication link using the second RAT comprises: determining to prioritize antenna selection for the second communication link using the second RAT based at least in part on a determination that at least a subset of the one or more antenna prioritization parameters are not satisfied.

Aspect 7: The method of any of Aspects 4-6, wherein the one or more antenna prioritization parameters include at least one of: a service type associated with the first communication link, a signal measurement associated with the first communication link, or a difference in signal measurements between a transmit antenna for the first communication link and a non-transmit antenna for the first communication link. Aspect 8: The method of Aspect 7, wherein determining whether to prioritize antenna selection for the first communication link using the first RAT or the second communication link using the second RAT comprises: determining to prioritize antenna selection for the first communication link using the first RAT based at least in part on the service type associated with the first communication link being a voice over Long Term Evolution (VoLTE) service or a voice over New Radio (VoNR) service. Aspect 9: The method of Aspect 7 or 8, wherein determining whether to prioritize antenna selection for the first communication link using the first RAT or the second communication link using the second RAT comprises: determining to prioritize antenna selection for the first communication link using the first RAT based at least in part on a determination that the signal measurement associated with the first communication link does not satisfy a threshold.

Aspect 10: The method of Aspect 7 or 8, wherein determining whether to prioritize antenna selection for the first communication link using the first RAT or the second communication link using the second RAT comprises: determining to prioritize antenna selection for the second communication link using the second RAT based at least in part on a determination that the signal measurement associated with the first communication link satisfies a threshold.

Aspect 11: The method of any of Aspects 7-10, wherein determining whether to prioritize antenna selection for the first communication link using the first RAT or the second communication link using the second RAT comprises: determining to prioritize antenna selection for the first communication link using the first RAT based at least in part on a determination that the difference in signal measurements between the transmit antenna for the first communication link and the non-transmit antenna for the first communication link satisfies a threshold. Aspect 12: The method of any of Aspects 7-11, wherein determining whether to prioritize antenna selection for the first communication link using the first RAT or the second communication link using the second RAT comprises: determining to prioritize antenna selection for the second communication link using the second RAT based at least in part on a determination that the difference in signal measurements between the transmit antenna for the first communication link and the non-transmit antenna for the first communication link does not satisfy a threshold.

Aspect 13: The method of any of Aspects 1-12, wherein determining whether to prioritize antenna selection for the first communication link using the first RAT or the second communication link using the second RAT comprises: determining to prioritize antenna selection for the first communication link using the first RAT; and wherein the method further comprises: selecting a first transmit antenna, of a plurality of antennas of the UE, for the first communication link; and selecting a second transmit antenna, of the plurality of antennas, for the second communication link, after selecting the first transmit antenna for the first communication link. Aspect 14: The method of Aspect 13, wherein selecting the first transmit antenna for the first communication link comprises: selecting, as the first transmit antenna, a preferred transmit antenna for the first communication link.

Aspect 15: The method of Aspect 14, wherein selecting the second transmit antenna for the second communication link after selecting the first transmit antenna for the first communication comprises: selecting, as the second transmit antenna, a remaining antenna of the plurality of antennas for the second communication link, wherein the remaining antenna is different from the preferred transmit antenna. Aspect 16: The method of Aspect 15, further comprising: determining a sounding reference signal (SRS) alternative path for the second transmit antenna; and determining a blanking mask for the first communication link on the first transmit antenna based at least in part on the SRS alternative path for the second transmit antenna.

Aspect 17: The method of any of Aspects 13-16, further comprising: refraining from switching antenna selection priority between the first communication link and the second communication link for a configured time period from determining to prioritize antenna selection for the first communication link. Aspect 18: The method of any of Aspects 1-17, wherein determining whether to prioritize antenna selection for the first communication link using the first RAT or the second communication link using the second RAT comprises: determining to prioritize antenna selection for the second communication link using the second RAT; and wherein the method further comprises: selecting a first transmit antenna of a plurality of antennas of the UE for the second RAT; and selecting a second transmit antenna of the plurality of antennas for the first RAT after selecting the first transmit antenna for the second RAT.

Aspect 19: The method of Aspect 18, wherein selecting the first transmit antenna for the second communication link comprises: selecting, as the first transmit antenna, a preferred transmit antenna for the first communication link. Aspect 20: The method of Aspect 19, wherein selecting the second transmit antenna for the first communication link after selecting the first transmit antenna for the second communication link comprises: selecting, as the second transmit antenna, a remaining antenna of the plurality of antennas for the second communication link, wherein the remaining antenna is different from the preferred transmit antenna. Aspect 21: The method of Aspect 20, further comprising: determining a sounding reference signal (SRS) alternative path for the first transmit antenna; and determining a blanking mask for the first communication link on the second transmit antenna based at least in part on the SRS alternative path for the first transmit antenna.

Aspect 22: The method of any of Aspects 19 to 21, further comprising: refraining from switching antenna selection priority between the first communication link and the second communication link for a configured time period from determining to prioritize antenna selection for the second communication link. Aspect 23: The method of any of Aspects 1-22, wherein the first RAT comprises a Long Term Evolution (LTE) RAT; and wherein the second RAT comprises a New Radio (NR) RAT. Aspect 24: The method of any of Aspects 1-23, wherein the first RAT and the second RAT share a radio frequency (RF) front-end of the UE.

Aspect 25: The method of any of Aspects 1-24, wherein determining whether to prioritize antenna selection for the first communication link using the first RAT or the second communication link using the second RAT comprises: determining to prioritize antenna selection for the first communication link using the first RAT based at least in part on a determination that a second highest reference signal received power (RSRP) measurement associated with the first communication link does not satisfy a threshold. Aspect 26: The method of any of Aspects 1-24, wherein determining whether to prioritize antenna selection for the first communication link using the first RAT or the second communication link using the second RAT comprises: determining to prioritize antenna selection for the second communication link using the second RAT based at least in part on a determination that a second highest reference signal received power (RSRP) measurement associated with the first communication link satisfies a threshold.

Aspect 27: An apparatus for wireless communication at a device, comprising a processor; memory coupled with the processor; and instructions stored in the memory and executable by the processor to cause the apparatus to perform the method of one or more Aspects of Aspects 1-26. Aspect 28: A device for wireless communication, comprising a memory and one or more processors coupled to the memory, the memory and the one or more processors configured to perform the method of one or more Aspects of Aspects 1-26.

Aspect 29: An apparatus for wireless communication, comprising at least one means for performing the method of one or more Aspects of Aspects 1-26. Aspect 30: A non-transitory computer-readable medium storing code for wireless communication, the code comprising instructions executable by a processor to perform the method of one or more Aspects of Aspects 1-26. Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    establishing a first communication link using a first radio access technology (RAT);
    establishing a second communication link using a second RAT; and
    prioritizing antenna selection for the first communication link or the second communication link based at least in part on a difference in signal measurements between a transmit antenna for the first communication link and a non-transmit antenna for the first communication link satisfying a threshold.

2. The method of claim 1, wherein prioritizing antenna selection for the first communication link or the second communication link comprises:
    prioritizing antenna selection for the first communication link based at least in part on the first communication link being associated with a voice call service.

3. The method of claim 2, wherein the voice call service is voice over Long Term Evolution (VoLTE) service or voice over New Radio (VoNR) service.

4. The method of claim 1, wherein prioritizing antenna selection for the first communication link or the second communication link comprises:
    prioritizing antenna selection for the first communication link to establish an initial dual connectivity configuration.

5. The method of claim 1, wherein prioritizing antenna selection for the first communication link or the second communication link comprises:
    selecting a first antenna for the first communication link; and
    selecting a second antenna for the second communication link.

6. The method of claim 5, wherein the second antenna is selected for the second communication link after the first antenna is selected for the first communication link.

7. The method of claim 1, wherein prioritizing antenna selection for the first communication link or the second communication link comprises:
    prioritizing antenna selection for the first communication link or the second communication link based at least in part on one or more antenna prioritization parameters, wherein the one or more antenna prioritization parameters include one or more of:
        a type of service being provided on the first communication link,
        one or more signal measurement thresholds for the first communication link,
        a power headroom measurement threshold for the first communication link, or
        an antenna measurement differential threshold for the first communication link.

8. The method of claim 1, further comprising:
    determining a sounding reference signal (SRS) alternative path for a transmit antenna selected for the second communication link; and
    determining a blanking mask for the first communication link on a transmit antenna selected for the first communication link based at least in part on the SRS alternative path for the transmit antenna selected for the second communication link.

9. The method of claim 1, wherein prioritizing antenna selection for the first communication link or the second communication link comprises:
    prioritizing antenna selection for the first communication link based at least in part on a second highest reference signal received power (RSRP) measurement associated with the first communication link not satisfying another threshold, or
    prioritizing antenna selection for the second communication link based at least in part on the second highest RSRP measurement associated with the first communication link satisfying the other threshold.

10. A user equipment (UE) for wireless communication, comprising:
    one or more memories; and
    one or more processors, coupled to the one or more memories, configured to cause the UE to:
        establish a first communication link using a first radio access technology (RAT);
        establish a second communication link using a second RAT; and
        prioritize antenna selection for the first communication link or the second communication link based at least in part on a difference in signal measurements between a transmit antenna for the first communication link and a non-transmit antenna for the first communication link satisfying a threshold.

11. The UE of claim 10, wherein the one or more processors, to cause the UE to prioritize antenna selection for the first communication link or the second communication link, are configured to cause the UE to:
    prioritize antenna selection for the first communication link based at least in part on the first communication link being associated with a voice call service.

12. The UE of claim 11, wherein the voice call service is voice over Long Term Evolution (VoLTE) service or voice over New Radio (VoNR) service.

13. The UE of claim 10, wherein the one or more processors, to cause the UE to prioritize antenna selection for the first communication link or the second communication link, are configured to cause the UE to:
    prioritize antenna selection for the first communication link to establish an initial dual connectivity configuration.

14. The UE of claim 10, wherein the one or more processors, to cause the UE to prioritize antenna selection for the first communication link or the second communication link, are configured to cause the UE to:
  select a first antenna for the first communication link; and
  select a second antenna for the second communication link.

15. The UE of claim 14, wherein the one or more processors, to cause the UE to select the second antenna for the second communication link, are configured to cause the UE to:
  select the second antenna for the second communication link after the first antenna is selected for the first communication link.

16. The UE of claim 10, wherein the one or more processors, to cause the UE to prioritize antenna selection for the first communication link or the second communication link, are configured to cause the UE to:
  prioritize antenna selection for the first communication link or the second communication link based at least in part on one or more antenna prioritization parameters, wherein the one or more antenna prioritization parameters include one or more of:
    a type of service being provided on the first communication link,
    one or more signal measurement thresholds for the first communication link,
    a power headroom measurement threshold for the first communication link, or
    an antenna measurement differential threshold for the first communication link.

17. The UE of claim 10, wherein the one or more processors are further configured to cause the UE to:
  determine a sounding reference signal (SRS) alternative path for a transmit antenna selected for the second communication link; and
  determine a blanking mask for the first communication link on a transmit antenna selected for the first communication link based at least in part on the SRS alternative path for the transmit antenna selected for the second communication link.

18. The UE of claim 10, wherein the one or more processors, to cause the UE to prioritize antenna selection for the first communication link or the second communication link, are configured to cause the UE to:
  prioritize antenna selection for the first communication link based at least in part on a second highest reference signal received power (RSRP) measurement associated with the first communication link not satisfying another threshold, or
  prioritize antenna selection for the second communication link based at least in part on the second highest RSRP measurement associated with the first communication link satisfying the other threshold.

19. A non-transitory computer-readable medium storing a set of instructions, the set of instructions comprising:
  one or more instructions that, when executed by one or more processors of a user equipment (UE), cause the UE to:
    establish a first communication link using a first radio access technology (RAT);
    establish a second communication link using a second RAT; and
    prioritize antenna selection for the first communication link or the second communication link based at least in part on a difference in signal measurements between a transmit antenna for the first communication link and a non-transmit antenna for the first communication link satisfying a threshold.

20. The non-transitory computer-readable medium of claim 19, wherein the one or more instructions, that cause the UE to prioritize antenna selection for the first communication link or the second communication link, cause the UE to:
  prioritize antenna selection for the first communication link based at least in part on the first communication link being associated with a voice call service.

21. The non-transitory computer-readable medium of claim 20, wherein the voice call service is voice over Long Term Evolution (VoLTE) service or voice over New Radio (VoNR) service.

22. The non-transitory computer-readable medium of claim 19, wherein the one or more instructions, that cause the UE to prioritize antenna selection for the first communication link or the second communication link, cause the UE to:
  prioritize antenna selection for the first communication link to establish an initial dual connectivity configuration.

23. The non-transitory computer-readable medium of claim 19, wherein the one or more instructions, that cause the UE to prioritize antenna selection for the first communication link or the second communication link, cause the UE to:
  select a first antenna for the first communication link; and
  select a second antenna for the second communication link.

24. The non-transitory computer-readable medium of claim 23, wherein the one or more instructions, that cause the UE to select the second antenna for the second communication link, cause the UE to:
  select the second antenna for the second communication link after the first antenna is selected for the first communication link.

25. The non-transitory computer-readable medium of claim 19, wherein the one or more instructions, that cause the UE to prioritize antenna selection for the first communication link or the second communication link, cause the UE to:
  prioritize antenna selection for the first communication link or the second communication link based at least in part on one or more antenna prioritization parameters, wherein the one or more antenna prioritization parameters include one or more of:
    a type of service being provided on the first communication link,
    one or more signal measurement thresholds for the first communication link,
    a power headroom measurement threshold for the first communication link, or
    an antenna measurement differential threshold for the first communication link.

26. The non-transitory computer-readable medium of claim 19, wherein the one or more instructions further cause the UE to:
  determine a sounding reference signal (SRS) alternative path for a transmit antenna selected for the second communication link; and
  determine a blanking mask for the first communication link on a transmit antenna selected for the first communication link based at least in part on the SRS alternative path for the transmit antenna selected for the second communication link.

27. The non-transitory computer-readable medium of claim 19, wherein the one or more instructions, that cause the UE to prioritize antenna selection for the first communication link or the second communication link, cause the UE to:
- prioritize antenna selection for the first communication link based at least in part on a second highest reference signal received power (RSRP) measurement associated with the first communication link not satisfying another threshold, or
- prioritize antenna selection for the second communication link based at least in part on the second highest RSRP measurement associated with the first communication link satisfying the other threshold.

28. An apparatus for wireless communication, comprising:
- means for establishing a first communication link using a first radio access technology (RAT);
- means for establishing a second communication link using a second RAT; and
- means for prioritizing antenna selection for the first communication link or the second communication link based at least in part on a difference in signal measurements between a transmit antenna for the first communication link and a non-transmit antenna for the first communication link satisfying a threshold.

29. The apparatus of claim 28, further comprising:
- means for determining a sounding reference signal (SRS) alternative path for a transmit antenna selected for the second communication link; and
- means for determining a blanking mask for the first communication link on a transmit antenna selected for the first communication link based at least in part on the SRS alternative path for the transmit antenna selected for the second communication link.

30. The apparatus of claim 28, wherein the means for prioritizing antenna selection for the first communication link or the second communication link comprises:
- means for prioritizing antenna selection for the first communication link based at least in part on a second highest reference signal received power (RSRP) measurement associated with the first communication link not satisfying another threshold, or
- means for prioritizing antenna selection for the second communication link based at least in part on the second highest RSRP measurement associated with the first communication link satisfying the other threshold.

* * * * *